(12) United States Patent
Cardarelli

(10) Patent No.: US 7,549,334 B2
(45) Date of Patent: Jun. 23, 2009

(54) SMALL ANGLE BIAS MEASUREMENT MECHANISM FOR MEMS INSTRUMENTS

(75) Inventor: Donato Cardarelli, Medfield, MA (US)

(73) Assignee: Milli Sensor Systems + Actuators, West Newton, MA (US)

( * ) Notice: Subject to any disclaimer, the term of this patent is extended or adjusted under 35 U.S.C. 154(b) by 22 days.

(21) Appl. No.: 11/739,499

(22) Filed: Apr. 24, 2007

(65) Prior Publication Data

US 2007/0245826 A1    Oct. 25, 2007

Related U.S. Application Data

(63) Continuation-in-part of application No. 11/426,368, filed on Jun. 26, 2006, now Pat. No. 7,406,867.

(60) Provisional application No. 60/745,438, filed on Apr. 24, 2006.

(51) Int. Cl.
G01P 9/04 (2006.01)
G01C 25/00 (2006.01)
G01C 19/00 (2006.01)

(52) U.S. Cl. ............ 73/504.13; 73/504.12; 73/1.77

(58) Field of Classification Search ............ 73/504.02, 73/504.04, 504.12, 504.13, 504.14, 514.01, 73/514.02, 504.03, 504.08, 504.09, 504.11, 73/1.37, 1.38, 1.77
See application file for complete search history.

(56) References Cited

U.S. PATENT DOCUMENTS

| 5,712,426 | A  | * | 1/1998  | Sapuppo et al. | 73/504.03 |
| 6,338,274 | B1 | * | 1/2002  | Carroll        | 73/514.15 |
| 6,701,781 | B1 | * | 3/2004  | Lutowsky et al.| 73/204.25 |
| 6,725,719 | B2 |   | 4/2004  | Cardarelli     |           |
| 6,859,751 | B2 |   | 2/2005  | Cardarelli     |           |
| 6,964,195 | B2 | * | 11/2005 | Hobbs et al.   | 73/504.14 |
| 7,100,446 | B1 | * | 9/2006  | Acar et al.    | 73/504.13 |
| 7,191,636 | B2 |   | 3/2007  | Jaffe          |           |
| 2007/0240486 | A1 |   | 10/2007 | Moore et al.   |           |
| 2007/0245800 | A1 |   | 10/2007 | Shirasaka et al. |        |

* cited by examiner

*Primary Examiner*—Helen C. Kwok
(74) *Attorney, Agent, or Firm*—Brian M. Dingman; Mirick, O'Connell, Demallie & Lougee, LLP

(57) ABSTRACT

A system and method for separating bias instability of MEMS inertial instruments such as gyroscopes or accelerometers from the instrument signal, in which the inertial measurement instrument has an input axis and an output signal, and the bias instability has a frequency. The instrument is oscillated about an oscillation axis that is orthogonal to the input axis, at a frequency that is greater than the bias instability frequency. The instrument output signal is detected, and demodulated with a phase-sensitive detection method referenced to the instrument rotation.

46 Claims, 17 Drawing Sheets

SMALL ANGLE BIAS MEASUREMENT MECHANISM FOR MEMS INSTRUMENTS

CROSS REFERENCE TO RELATED APPLICATION

This application is a continuation in part of application Ser. No. 11/426,368 filed on Jun. 26, 2006, now U.S. Pat. No. 7,406,867 the disclosure of which is incorporated herein by reference. This application claims priority of Provisional application Ser. No. 60/745,438, with a filing date of Apr. 24, 2006, the disclosure of which is incorporated herein by reference.

FIELD OF THE INVENTION

This invention relates to MEMS inertial instruments such as gyroscopes and accelerometers.

BACKGROUND OF THE INVENTION

Micro-electro-mechanical systems (MEMS) gyroscopes and accelerometers, such as disclosed in U.S. Pat. Nos. 6,725,719 and 6,859,751, are generally planar instruments. Due to their very small size, and materials and methods of construction, such MEMS inertial instruments are relatively sensitive to ambient temperature and other environmental factors. These sensitivities makes them relatively unstable. Accordingly, it has been necessary to extensively test such instruments under a variety of conditions in order to develop a priori compensation schemes that can then be built into systems employing such instruments. This testing is time consuming and expensive, and also may not anticipate every possible condition that the instrument may be exposed to, which can lead to errors.

The accuracy of Microelectromechanical Systems (MEMS) gyroscopes and accelerometers depends on the stability of their bias. Bias is the non-zero instrument output in the absence of input. The bias has deterministic and random components. Each deterministic component can be related to a cause, which potentially can be controlled. Random components can be traced to a cause but cannot be controlled. The pertinent random component for this invention is the 1/f noise, which is related to intrinsic shot noise in the electronics and Brownian motion due to atoms colliding with the mechanical structures. The bias, as an offset value, can vary from turn-on to turn-on. The deterministic component can vary as a drift.

The problem is that under motion, the instrument bias is undistinguishable from the signal generated by the motion, hence the output in incorrect and the MEMS instrument is impractical and requires continuous correction to be useful.

SUMMARY OF THE INVENTION

The G2-Gyroscope is a Coriolis gyroscope where the drive and output sense motions are angular oscillations. Its structure is generally planar and composed of two members: a Gyro Member and a Drive Member. The Gyro Member is the gyro. The Drive Member supports the Gyro Member above the substrate and is used to oscillate the Gyro Member about the Drive Axis, without applying direct actuation to the Gyro Member. Under rotation rate input, the Gyro Member responds by oscillating about the Output Axis (orthogonal to the Drive Axis). The Input Axis and Drive Axis are orthogonal to each other and lie in the plane of the gyroscope. The Output Axis is aligned normal to the plane. An attribute of this design is that the Gyro Member can be made symmetric about the Output Axis and therefore reduce sensitivity to cross-axis rotation rate inputs. By using the Drive Member to indirectly drive the Gyro Member, error torques are minimized.

The inventive G2-Gyroscope design is a planar MEMS instrument that is suited for integration into a planar MEMS Inertial Measurement Unit (IMU) whereby gyroscopes and accelerometers, formed onto a single substrate, sense all six-degrees-of-freedom. The G2-Gyroscope is also operational on its own.

This invention relates to designs of the G2-Gyroscope with built-in bias stabilization capability.

This invention further relates to planar G2-Gyroscope designs with built-in bias stabilization capability capable of being fabricated with MEMS processing technologies.

This invention further relates to the symmetry of the Gyro Member about the Output Axis to reduce sensitivity to cross-axis rotation rates.

This invention further relates to the indirect drive of the Gyro Member through a Drive Member (DM), to which the Gyro Member is attached. The purpose is to minimize unwanted drive of the Gyro Member about the Output Axis (quadrature source).

This invention further relates to the components of the design and how they provide functionality to operate the gyroscope with built-in bias stabilization capability.

This invention also relates to the alternate design where the Gyro Member is larger and driven directly to oscillate about the Drive Axis. The larger size of the Gyro Member increases gyroscope sensitivity. In this case, the member that supports the gyro member relative to the substrate is not driven, and thus is not really a "Drive Member." This member may thus be generally termed, for both preferred embodiments, a "support member."

Although the gyroscope can be operated with any set of Drive Member and Gyro Member (also referred to as Inner Member) natural frequencies, the sensitivity is improved as the difference between them (offset) is reduced. Operation with an offset of zero is the most sensitive and represents a special case.

This invention addresses methods to separate both deterministic and random bias components from the signal and enable long-term use, without correction updates. In GPS/INS applications, the bias stabilized gyros can operate independently of the GPS system and further provide a check on its accuracy. The bias stabilized gyros can also operate autonomously.

The invention separates the bias from the gyroscope and accelerometer signals in two steps by: 1. modulating the instrument signal at a frequency that is larger than the bias instability and 2. demodulating the signal with a phase sensitive detection method (see A. J. Diefenderfer, *Principles of Electronic Instrumentation*, W.B. Saunders Pub., Philadelphia 1972, Ch. 12-Noise, pp. 473-487) referenced to the source of the modulation.

The invention combines signal modulation with phase sensitive detection methods applied at a high rate, which is necessary for MEMS instruments because their bias instability has a larger spectral content.

The phase sensitive detection method becomes more efficient at higher rates.

The phase sensitive detection method can be carried out numerically or electronically. If carried out with digital electronics, the two become the same.

The accelerometer signal modulation is generated by oscillating the instrument Input Axis (IA) about an orthogonal axis. The accelerometer signal is maximum when its IA is in-line with the Input Acceleration Axis, along which the vehicle accelerates. The signal is reduced when the instrument IA is rotated from the Input Acceleration Axis.

There are three Body Axes for the vehicle: a-Axis, b-Axis and c-Axis. The gyroscopes and accelerometers are arranged with three IMU axes: X-Axis, Y-Axis and Z-Axis. The X-Gyro Input Axis is aligned with the X-Axis, etc. During the rotation of the IMU, the c-Axis and Z-Axis are parallel. The X and Y instruments rotate about the c-Axis. The rotation oscillation is carried out by a bias rotary gimbal (BRG) and the rotation axis is also the BRG Axis.

Each instrument can also be oscillated by itself about an orthogonal axis.

For the case where all the instruments are part of a common member, and one rotation oscillation axis is designated, the instruments aligned with the rotation oscillation axis will not be stabilized by this invention. The instruments aligned with the other two orthogonal axes will be rotated and their signals modulated as their Input Axes are rotated relative to the body axes. Two rotation oscillation axes and instrument set-ups are required to stabilize instruments for all six degrees of freedom.

For the case where all the instruments are planar and located on the same planar substrate, the common substrate can be rotationally oscillated about the rotation oscillation axis. The instruments with Input Axes in the plane are stabilized by the rotation oscillation. As the in-plane instruments are rotation oscillated, they sense components of rotation rate and acceleration from the two co-planar Body Axes. The signal from each in-plane gyro and accelerometer will contain the vector sum of the rotation rates and accelerations of the separate Body Axes; large signal from the primary alignment and a small signal from the orthogonal input axis.

Phase sensitive detection is used to separate the rotation rates and accelerations by using rotation phase references tied to the two in-plane Body Axes, which are orthogonal.

During rotation oscillation, the bias is not modulated. The bias is therefore essentially filtered.

The carousel approach was applied to the much larger mechanical instruments with a rotation rate on the order of a revolution/minute, sufficient to eliminate the deterministic drift and not adversely affect the instruments. The 1/f instability was much lower than the signal and was not a consideration.

For MEMS, instruments, however, which are much smaller, the bias drift is larger and the 1/f instability much more significant. The carousel requirement for the MEMS case is a much larger rotation rate, the value of which is dependent on the temporal instability of the 1/f noise and the requirement of the phase-sensitive detection method. With a small angle oscillation, a larger oscillation rate can be used.

The carousel method works equally as well for the MEMS gyroscopes and accelerometers. The primary requirement for the instruments, however, is for the instruments not to be affected by the rotation oscillation (zero cross-axis sensitivity).

The carousel method can be applied with a full rotation or a partial rotation (small angle).

This invention works well with the G2-Gyro described herein because of its low cross-axis sensitivity. This invention also works with other MEMS gyroscope and accelerometer designs.

This invention also relates to the use of high rotational oscillation frequency to stabilize instrument operation to include 1/f instability. This applies to MEMS as well as non-MEMS instruments where high frequencies are tolerated.

The invention can be mechanized with an oscillatory platform (planar or bulk) on which is placed the planar or bulk IMU or any number of gyroscopes and accelerometers, of which, those with in-plane axes are stabilized.

The invention can also be mechanized with the individual instrument mounted to a rotation oscillation mechanism.

The invention can also be mechanized by integrating a rotary structure with the individual instrument, with which a rotary oscillatory motion can be applied. With MEMS instruments, which require flexures, the motion is limited by the flexure and therefore an oscillatory motion is used with a constant amplitude.

A rotary pick-off is used to measure the rotary angle of oscillation. The rotary angle of oscillation is used to develop the demodulation reference waveform, which is phased to the Body Axes.

The invention also relates to the combination of rotary oscillation and phase-sensitive detection to eliminate bias drift and 1/f bias instability from the gyro and accelerometer signals.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS OF THE INVENTION

Design Guidelines

The design of one preferred embodiment of the invention incorporates:
- a symmetric disk (Gyro Member or "GM" herein) in the plane of the instrument that is driven to oscillate about an axis in the plane (Drive Axis), by the use of an outer structure, the Drive Member; the gyro output motion is the oscillation of the disk about the axis normal to the plane (Output Axis); the purpose of the symmetric disk is to reduce sensitivity to cross-axis rotation rate,
- the disk is mounted to the Drive Member (DM) so that the drive of the disk about the Drive Axis is accomplished through the DM structure and actuation is not applied directly to the disk itself, the purpose is to minimize the inadvertent drive of the disk about the Output Axis,
- the Drive Member is connected with a pair of torsional flexures to bonding pads attached to the substrate,
- a mesa between the bonding pads and the substrate provides the working gap that allows motion of the GM and DM about the drive axis,
- a set of radial flexures suspends the disk from the Drive Member and allow its oscillation about the Output Axis,
- each radial flexure incorporates stress reliefs to minimize the DM stress imparted on the disk that affects its free motion,
- actuation of the Drive Member is done with two sets of capacitor plates located underneath the DM and on both sides of the Drive Axis,
- motions of the disk and Drive Member are sensed with capacitive pick-offs that operate differentially to cancel common-mode noise; at zero rotation rate, the difference in capacitance is zero and the output is zero,
- the mechanical structure consists of two moving members cut from one material (monolithic construction); the full structure is connected electrically to ground (or common potential),
- the monolithic structure is mounted onto a rigid substrate onto which are also located the stators for driving (actuating) and sensing the motion of the members,
- the rigid substrate provides a stable base for the gyroscope and maintains its alignment,
- the Pyrex base is a material that enables anodic bonding of the epitaxial silicon to the Pyrex; its electrical insulation property separates the gyroscope from other devices that may be located on the same substrate,
- the thickness of the gyroscope structure is sufficiently large that the members oscillate as thin plates with little structural distortion, and
- the working gap is large enough to prevent stiction to the substrate.

Modeling

G2-Gyroscope Structure

Figure 1A:
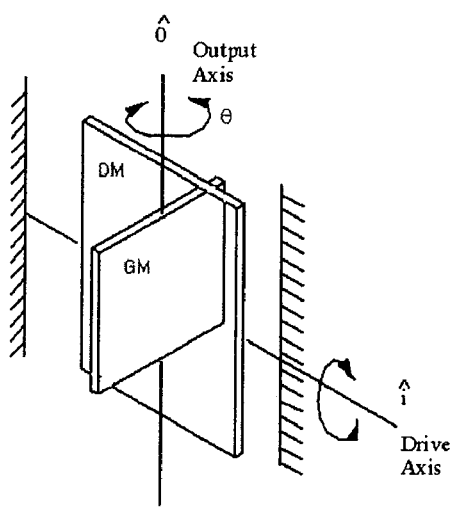
FIGS. 1A and B are stick figures representing the inventive G2-Gyroscope design structure.
Figure 1B:
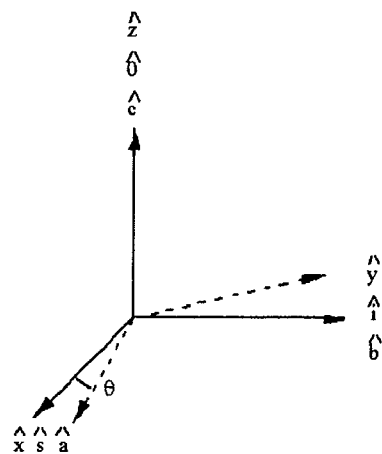

The G2-Gyro structure is based on two nested members that oscillate in angle about orthogonal axes defined by two sets of flexures as shown in FIGS. 1A and 1B. The inner member (IM) is called the Gyro Member (GM) and the outer member (OM) is called the Drive Member (DM). The Gyro Member is mounted with flexures to the Drive Member and rotates by angle $\theta$ relative to the Drive Member. The DM is mounted to the case (substrate) with flexures and rotates by angle $\phi$ relative to the case (substrate). Since the gyroscope is an oscillatory device, the angles $\theta$, $\phi$ are small. The two sets of flexures define axes of rotation that are orthogonal. There are three co-ordinate axes that apply; the first, (s,i,o) is fixed to the Gyro Member; the second, (x,y,z) is fixed to the Drive Member and the third, (a,b,c) is fixed to the case and rotates in inertial space. The case angles of rotation are not limited. The Gyro Member equation of motion describes the motion of the GM under rotation in inertial space and describes the output of the gyro.

Equation of Motion

Analysis is used to derive the equation of motion for the Gyro Member when the Drive Member is oscillated at some frequency and amplitude as the Case undergoes rotation in inertial space. The resultant equation of motion is given by $$I_{GM}\ddot{\theta} + D_{GM}\dot{\theta} + \left[K_{GM} + \left\{(\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right\}\Delta I\right]\theta - $$
$$(\Omega_a\Omega_b + \Omega_a\Omega_c\tilde{\phi}\sin\omega t + \Omega_a\tilde{\phi}\omega\cos\omega t)\theta^2 = $$
$$I_{GM}\Omega_a\tilde{\phi}\omega\cos\omega t - \Delta I(\Omega_a\Omega_b + \Omega_b\Omega_c\tilde{\phi}\sin\omega t + \Omega_a\tilde{\phi}\omega\cos\omega t) \quad (1)$$

where
- $I_{GM}$: GM moment of inertia about the o-axis (Output Axis)
- $D_{GM}$: GM damping
- $K_{GM}$: GM flexure stiffness (spring constant)
- $\theta$: rotation angle of the GM relative to the DM
- $\phi$: DM rotation angle relative to the case
- $\Omega_a, \Omega_b, \Omega_c$: rotation rates of the case in inertial space about three axes
- $\Delta I = I_i - I_s$: difference of GM inertias about the i-axis and s-axis
- $\phi = \tilde{\phi}\sin(\omega t)$: DM oscillatory angular motion
- $\dot{\phi} = \omega\tilde{\phi}\cos\omega t$: rate of DM angular motion To the left of the equals sign are included the torque terms dependent on inertia, damping and stiffness as well as a nonlinear (fourth) term dependent on GM angle squared. The stiffness (third) term is given by $$\left[K_{GM} + \left\{(\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right\}\Delta I\right] \quad (2)$$

The stiffness term includes a constant flexure stiffness, $K_{GM}$, and a component dependent on vehicle rotation rates, $\Omega_a, \Omega_b, \Omega_c$, DM drive frequency, $\omega$, and a factor referred to as the tuning inertia, $\Delta I$.

On the right of the equals sign are given terms that drive the GM. They include a gyroscope torque due to rotation rate about the Input Axis and others due to case rotation about cross-axes that are coupled by the tuning inertia. They are respectively:

$$I_{GM}\Omega_a\phi\omega \cos \omega t \text{ and } \Delta I(\Omega_a\Omega_b+\Omega_b\Omega_c\phi \sin \omega t+\Omega_a\phi\omega \cos \omega t).$$

G2-Gyro Mechanization/Mechanical Response

From the equation of motion, the gyroscope operation is simplified by making the GM symmetric about the o-axis (Output Axis) so that $\Delta I=0$. The resultant equation of motion becomes $$I_{GM}\ddot{\theta}+D_{GM}\dot{\theta}+K_{GM}\theta=I_{GM}\Omega_a\phi\omega \cos \omega t \quad (3)$$

The interpretation is that of a simple harmonic GM oscillator driven externally by a gyroscopic torque that results from the oscillatory motion of the DM and input rotation rate. Rewriting the GM EOM in the "Standard Form", we get $$\ddot{\vartheta} + 2\xi\omega_{GM}\dot{\vartheta} + \omega_{GM}^2 \vartheta = \tilde{\phi}(\omega)\Omega_a\cos\omega t \quad (4)$$

where $$2\xi_{GM}\omega_{GM} = D_{GM}/I_{GM}$$

$$\xi_{GM} = \frac{1}{2}\frac{D_{GM}}{I_{GM}\omega_{GM}}$$

$\xi_{GM}$ is the GM damping factor, and $$\omega_{GM}^2 = K_{GM}/I_{GM} \quad (6)$$

$$\omega_{GM} = \sqrt{\frac{K_{GM}}{I_{GM}}}$$

where $\omega_{GM}$ is the GM natural frequency.

The solution describes the oscillatory motion of the GM in response to gyroscope input rotation rate, and is given by $$\theta(t)=\theta \sin(\omega t-\epsilon_{GM}) \quad (7)$$

where $\theta$ is the GM oscillatory amplitude and $\epsilon_{GM}$ is the GM oscillation phase relative to the gyroscopic drive.

$$\tilde{\vartheta}(\omega) = \frac{\frac{I_{GM}}{K_{GM}}\Omega_a\omega\tilde{\phi}(\omega)}{\left[\left(2\xi_{GM}\frac{\omega}{\omega_{GM}}\right)^2 + \left(1-\frac{\omega^2}{\omega_{GM}^2}\right)^2\right]^{1/2}} \quad (8)$$

$$\epsilon_{GM}(\omega) = \tan^{-1}\left(\frac{2\xi_{GM}\frac{\omega}{\omega_{GM}}}{1-\frac{\omega^2}{\omega_{GM}^2}}\right) \quad (9)$$

These solutions can be plotted to obtain the Transfer Functions or Bode of the GM. Note that the response is also dependent on the DM amplitude, which also varies with angular frequency (the GM is coupled to the DM).

Practical Gyroscope Case—Offset Operation

For the practical gyroscope, the DM is driven at resonance to minimize the drive voltage and to maximize the DM oscillation amplitude. The GM response then depends on the GM and DM natural frequencies (note that the DM comprises the gyro disk for purposes of calculating the DM inertia about the Drive Axis and the DM natural frequency). The maximum DM amplitude and phase at resonance are given by $$\tilde{\phi}(\omega_{DM}) = \frac{\tilde{\Gamma}_{DM}}{D_{DM}\omega_{DM}} \quad \epsilon(\omega_{DM}) = \frac{\pi}{2} \quad (10)$$

where $$\Gamma_{DM} = \frac{V^2}{2}\frac{\delta C}{\delta \phi} \quad (11)$$

is the torque applied by the capacitive actuator. The GM responses for amplitude and phase for GM and DM natural frequencies are $$\tilde{\vartheta}_{Out} = \tilde{\vartheta}(\omega_{DM}) = \frac{\frac{I_{DM}}{K_{DM}}\Omega\omega_{DM}\tilde{\phi}(\omega_{DM})}{\left[\left(2\xi_{GM}\frac{\omega_{DM}}{\omega_{GM}}\right)^2 + \left(1-\frac{\omega_{DM}^2}{\omega_{GM}^2}\right)^2\right]^{1/2}} \quad (12)$$

$$\epsilon_{GM}(\omega_{DM}) = \frac{\pi}{2} + \tan^{-1}\left(\frac{2\xi_{GM}\frac{\omega_{DM}}{\omega_{GM}}}{1-\frac{\omega_{DM}^2}{\omega_{GM}^2}}\right) \quad (13)$$

Matched Frequency Case: Zero Offset

The maximum sensitivity is obtained for the case in which the DM and GM resonances are matched, $\omega_{DM}=\omega_{GM}$. The output per rotation rate input (Scale Factor) then is given by $$\tilde{\vartheta}_{matched} = \frac{I_{GM}}{D_{GM}}\tilde{\phi}\Omega_a \quad (14)$$

The output amplitude is dependent directly on the GM inertia, inversely with damping and directly with DM oscillation amplitude. A vacuum is necessary to develop the proper damping. In this case, it can readily be seen that the gyro sensitivity scales with size and inversely with damping.

General Offset Description

Figure 2:
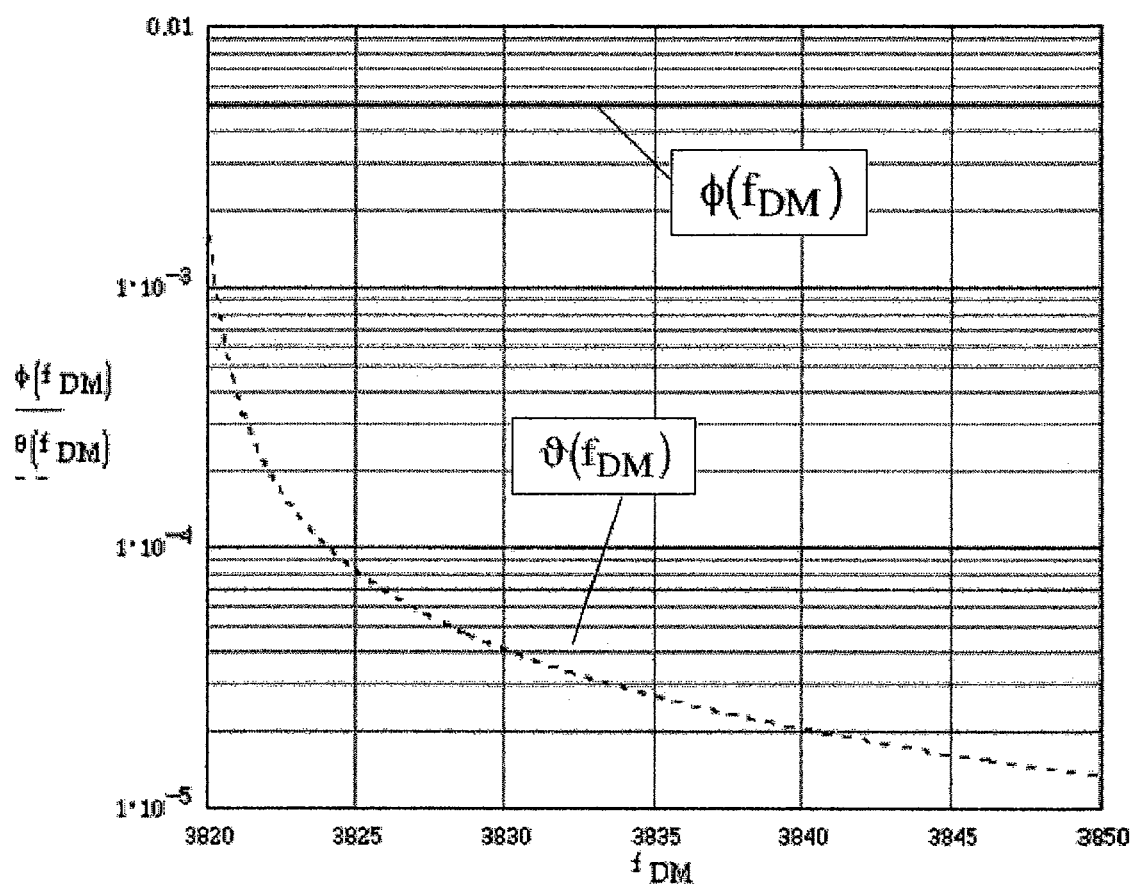
FIG. 2 is a graph of the Gyro signal dependence with offset frequency.

Gyro sensitivity is dependent on the separation (offset) between the GM and DM natural frequencies. In FIG. 2 is plotted the modeled dependence for a typical gyro case. The top curve is of the DM amplitude $\phi(f_{DM})$ and it is held constant. The lower curve is of the GM amplitude response for an input rotation rate of 1 rad/sec. Its amplitude $\theta(f_{DM})$ depends on the DM frequency and it increases as the offset is reduced.

G2-Gyro Requirements the DM is driven at resonance to the maximum amplitude possible as limited by the working gap between the device and the substrate, a phase-lock loop is used to maintain the operation of the DM at resonance, the DM amplitude is held constant with an amplitude control loop, the DM-GM frequency offset is held constant, excitation frequencies for operating the DM and GM capacitive sensors need to be sufficiently different to minimize pick-up between them, GM and DM oscillation axes are orthogonal to prevent drive of the GM by the DM oscillation, and DM actuation is done without actuating the GM directly.

G2-Gyro Operation

The DM is driven at some frequency and amplitude about the Drive Axis. When the gyro is rotated about the Input Axis (orthogonal to both the Drive Axis and Output Axis), the GM responds with an oscillation amplitude that is proportional to the Input Rotation Rate. Demodulation of the oscillatory output with a reference waveform at the same frequency and with the appropriate phase generates a gyro output DC voltage proportional to the Input Rotation Rate.

G2-Gyro Quadrature

A signal that is in "quadrature" with the gyro signal is an error signal generated by the improper operation of the gyroscope and the gyroscope design. Fortunately it is always out of phase by 90 degrees with the gyro signal and can be separated and filtered by proper demodulation. The phase of the demodulation reference waveform is to be controlled to prevent leakage of the quadrature signal into the gyro signal channel.

G2-Gyroscope Embodiment

Mechanical design

Figure 3:
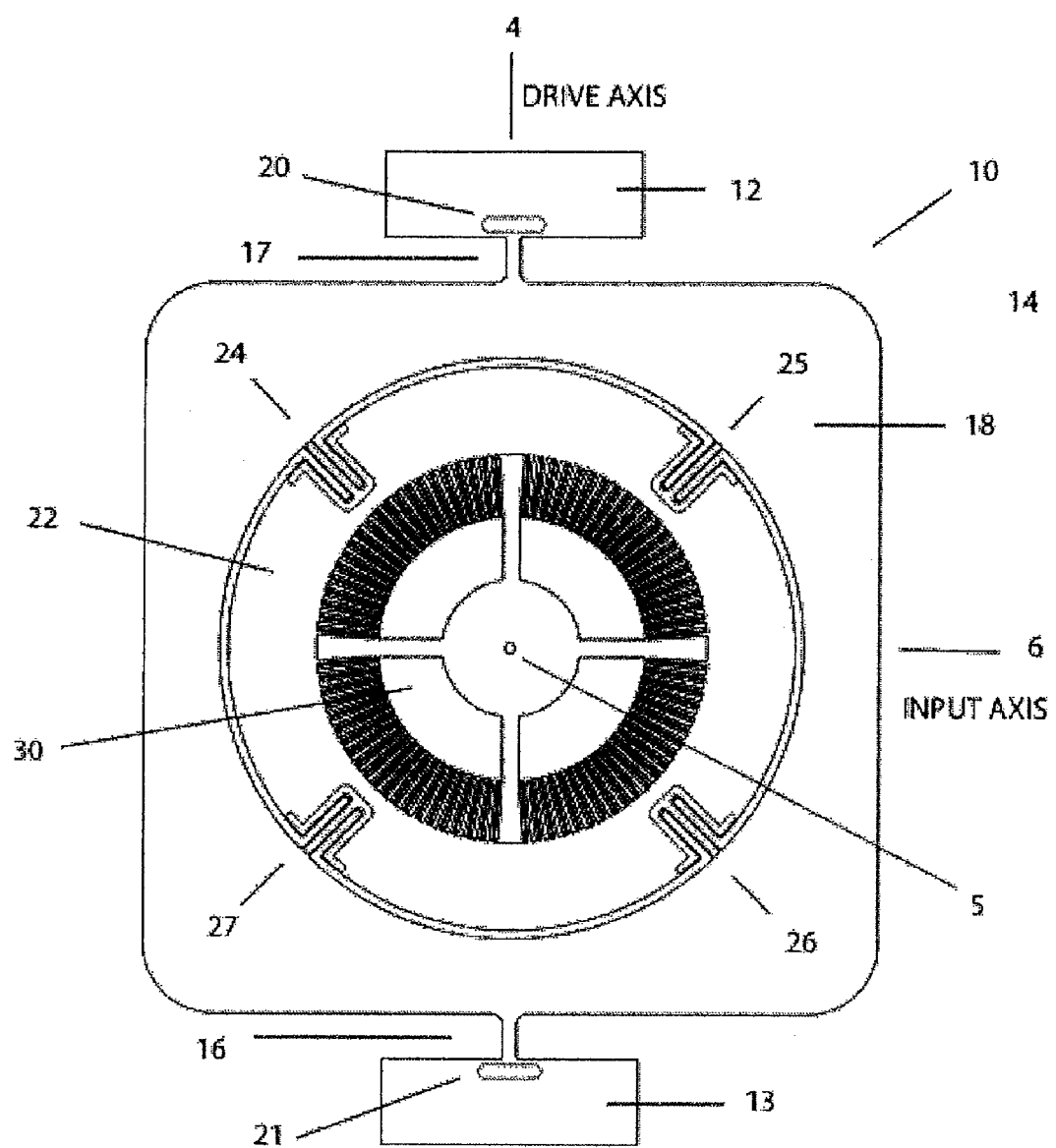
FIG. 3 is a top view of one embodiment of the inventive G2-Gyroscope mechanical design.
Figure 4:
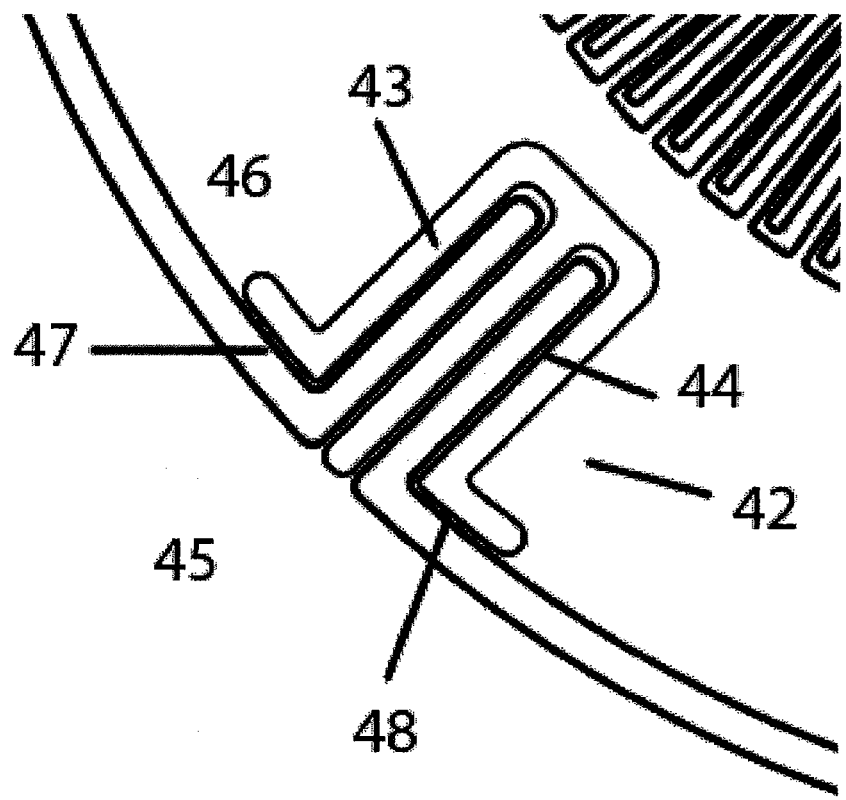
FIG. 4 is a close up view of the W-flexure of the G2-Gyroscope of FIG. 3.

The mechanical design of one preferred embodiment of the inventive G2-Gyroscope 10 is shown in FIG. 3. The rectangular shapes on each end are bonding pads 12, 13 used to bond the device to the Pyrex substrate 14. Two torsional flexures 16, 17 connect the Drive Member 18 to the bonding pads. The flexures are stress-relieved by the oval cutouts 20, 21 in the bonding pads. The square DM shape allows the placement of sufficiently large capacitive plates underneath for actuation. Sense plates are used to measure the motion of the DM. The Gyro Member 22 is an annular disk connected to the DM with four W-shaped flexures 24, 25, 26, 27. The W-flexure design 42 shown in FIG. 4 is made up of two U-shaped flexures 43, 44. One end of each is connected to the DM 45 and the other to the GM disk 46 through L-shaped segments 47, 48 essentially tangent to the disk curvature. The L-shaped segment is added to enable the U-structure to bend with GM rotation and to absorb stress between the DM and GM. The radial alignment of the flexures along diagonals across the DM makes a symmetric arrangement with each flexure experiencing the equivalent stress.

The working gap between the gyro structure and the Pyrex substrate is 10 microns but the gap used depends on several factors: geometry, actuation capacity, sensitivity and fabrication constraints. The gap is fabricated by etching a well in the silicon and a well in the Pyrex.

The use of Pyrex is dependent on the need to anodically bond epitaxial silicon to a substrate as described below in the DWP process. Other processes are possible. It is preferred to use a substrate that has similar thermal characteristics to the device material, which in this case is silicon. An option is to also use silicon as the substrate for a close thermal match and to enable anodic bonding with a deposited Pyrex-equivalent film added to the substrate silicon. This would also preserve the electrical isolation between devices on the same substrate.

It is preferred for the device to be monolithic for mechanical stability and to connect it to electrical ground.

On the inside diameter of the GM is constructed a radial comb 30 for sensing the rotation of the GM. The comb teeth are aligned radially with the GM center of rotation. Four sets of mating combs are constructed on four separate quadrants fixed separately to the substrate that serve as stators for the moving comb rotor on the GM. By connecting the bonding pads to traces, the silicon structure is connected to electrical ground.

The gyro is driven by actuation of the DM about the Drive Axis 4. The Output Axis 5 is normal to the plane of the DM. The Input Axis 6 is orthogonal to the other two.

Rotary Comb Capacitive Sensor

Figure 5:
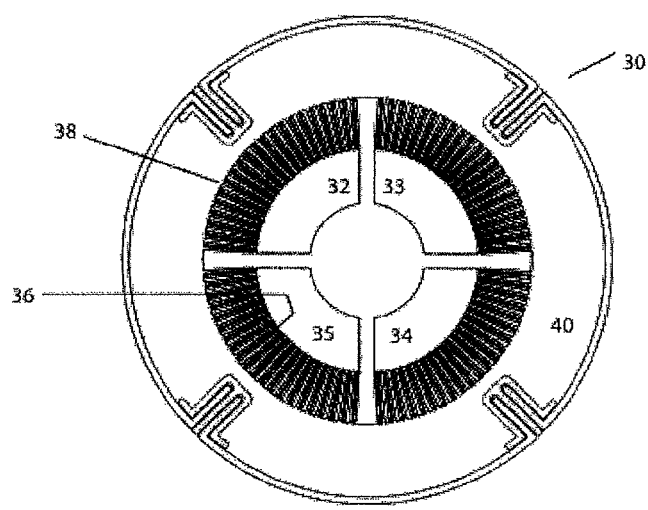
FIG. 5 is a close up view of the rotary comb design of the gyro of FIG. 3.

The rotary comb design 30 is illustrated in FIG. 5. It is separated into four quadrants 32, 33, 34, 35. For each quadrant, the comb is divided into a stator with stator comb fingers 36 attached to the substrate 14 and a rotor with rotor comb fingers 38 that are part of the moving GM disk structure 40. The stator fingers and rotor fingers are aligned radially with the center of rotation of the disk. For each rotor finger there is a stator finger with the two separated by a small gap. They make up a comb finger pair. Pairs of comb fingers are separated by a large gap. A number of comb finger pairs makes up each quadrant. The sensitivity of the comb sensor scales with the number of comb finger pairs. By reducing the small gap between the comb finger pairs, the sensitivity is increased.

Figure 6:
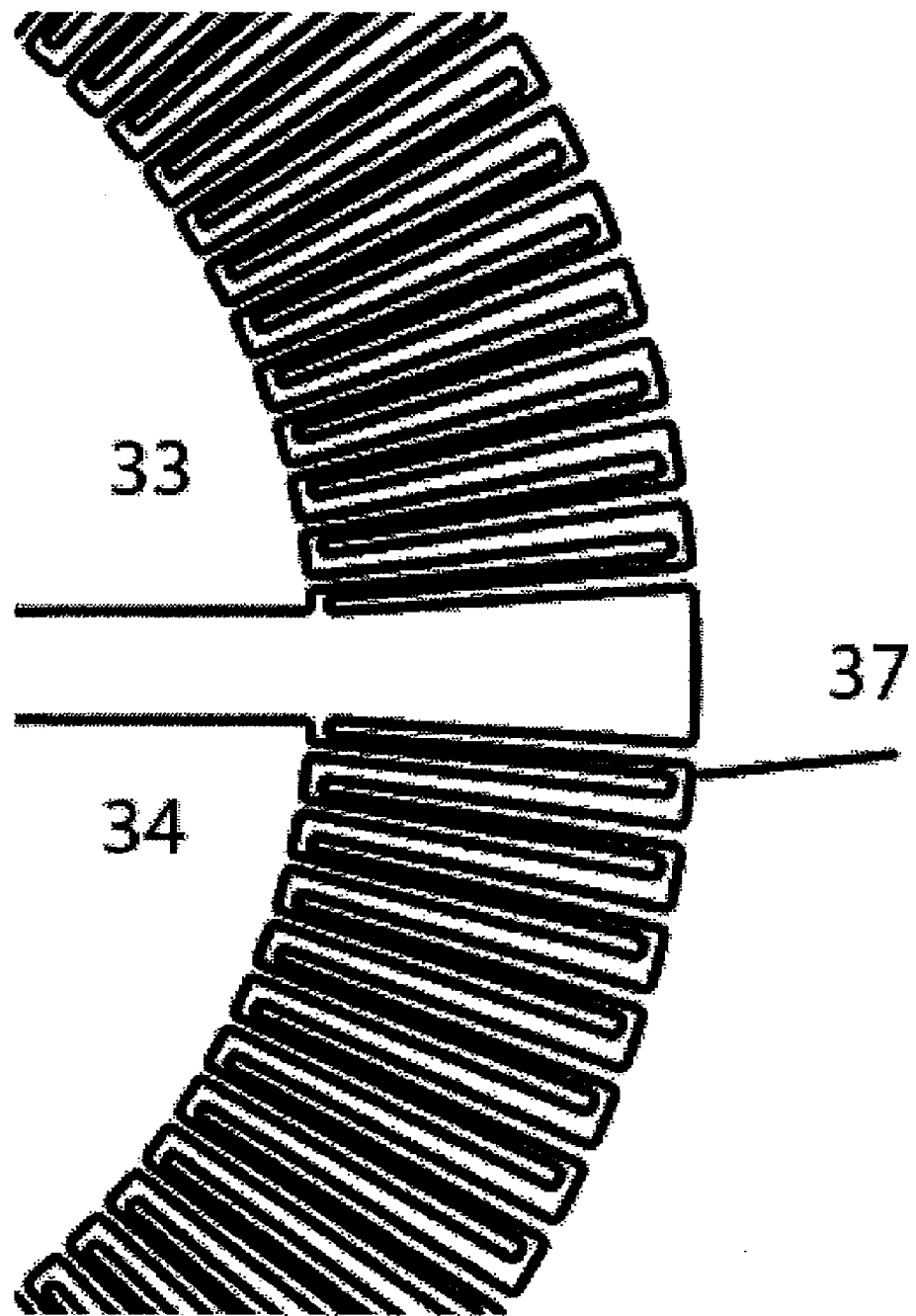
FIG. 6 shows the differential alignment between rotary comb quadrants of the rotary comb shown in FIG. 5.

Neighboring quadrants 33, 34 are designed symmetrically about the axis that separates them as shown in FIG. 6. For rotation of the rotor in either direction, the small gap 37 of comb finger pairs in one quadrant decreases while the small gap of comb finger pairs in the other quadrant increases. The purpose of the rotary design, based on neighboring quadrants, is that when the signals from the comb finger pairs located on neighboring quadrants are differenced, the signals add and the common-mode noise subtracts; this is differential operation. At zero rotation of the GM, the output is also zero. When the output from the third and fourth quadrants are added to the first and second, the signal is doubled again. This is the preferred operation of the rotary comb of the gyro for maximum sensitivity.

Alternate uses of the rotary comb are possible if one set of neighboring quadrants is connected for rotary sensing and the other set for actuation. One use is to test the operation of the Gyro Member separately. The second use is to cancel quadrature error by adding a counter motion of the Gyro Member.

Metallization Design of the G2-Gyroscope

Figure 7:
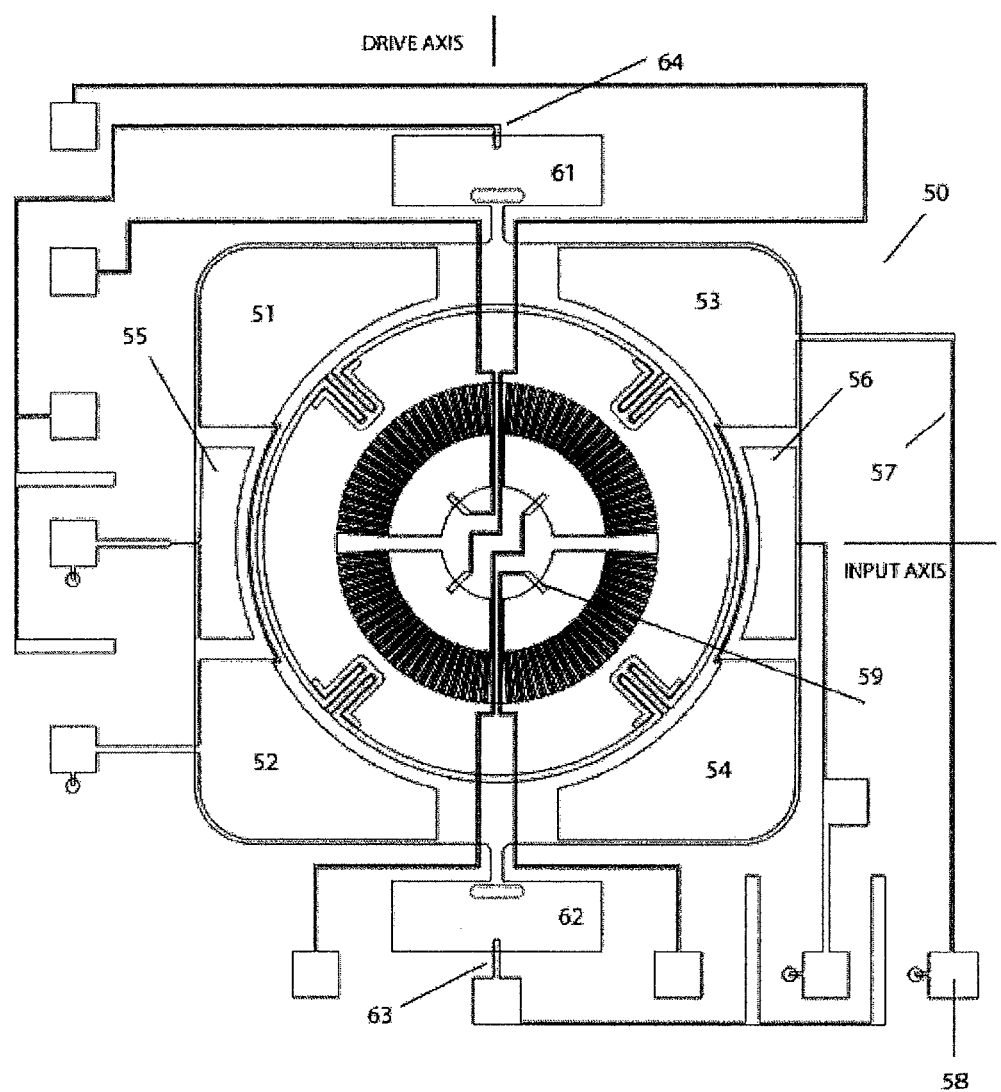
FIG. 7 is a schematic representation of the G2-Gyro metallization design for the embodiment of FIGS. 3-6.

The metallization design 50 is shown in FIG. 7. It consists of capacitive plates, conductor traces and pads. Capacitive plates 51 and 52 are located under part of the DM on one side of the Drive Axis. They are connected by a trace. Capacitive plates 53, 54 are located on the other side. They are connected by a trace. Drive voltages are applied to the actuator plates to predominantly pull down on one side of the DM during the first half of the drive cycle and to predominantly pull down on the other side of the DM during the second half of the drive cycle. The result is an oscillatory motion of the DM about the Drive Axis. The sensing of the DM motion is accomplished with two capacitive plates 55, 56. The outputs are connected differentially, since for any motion, the gap for one increases and the gap for the other decreases.

Trace 57 connects capacitive plates 53, 54 to pad 58, for example.

Stators of the rotary comb are connected to pads with traces 59 that are crimped between the stator structure and the Pyrex substrate during anodic bonding. The monolithic gyro structure containing the GM and DM is connected to pads by traces 63, 64 crimped between the mounting structures 61, 62 and the Pyrex substrate. The preferred electrical connection of the gyro structure is to ground.

Traces are also capacitive sensing plates when they are located beneath the moving structure and this needs to be taken into consideration. A rule is to make the lengths under the moving parts equal and symmetric. Pick-up between plates and traces is also a consideration. The usual design practices apply. Electrical pick-up can be a source of quadrature in the gyro output.

Flexures

The purposes of flexures are to:

set orientational alignment between members, govern rotation of the members about prescribed axes, and provide support for the members of the structure.

The orientational alignment between members is an especially important consideration for the gyroscope because misalignment introduces mechanical coupling between the DM oscillation and the Gyro Member and will generate quadrature error.

The ideal flexure allows only motion about one axis in the dynamic environment.

The support capability is especially important when considering shock capability. It depends on the masses of the members and the spring stiffness of the flexures. Modeling is used to identify the strain on the flexures. A maximum strain level less than one tenth the fracture limit is a good condition to set.

DM Flexure Relief Structure

The stress relief absorbs the tension on the flexure that is due to the differential thermal contraction as the Pyrex and silicon cool from the elevated anodic bonding temperature. The stress can cause a potato-chip deformation of the DM that affects the GM suspended from it.

IM Flexure

The W-flexure enables rotation of the GM about the axis normal to the plane. Four are used in this design. Each W-flexure is composed of two bending U-flexures with a stress relief in each. For cases where the DM applies a tension or compression to the W-flexure, the stress relief can bend and absorb the stress. In this way, the flexure does not kink and inhibit rotation of the GM.

G2-OUT Gyroscope—Alternative Preferred Embodiment

Figure 8:
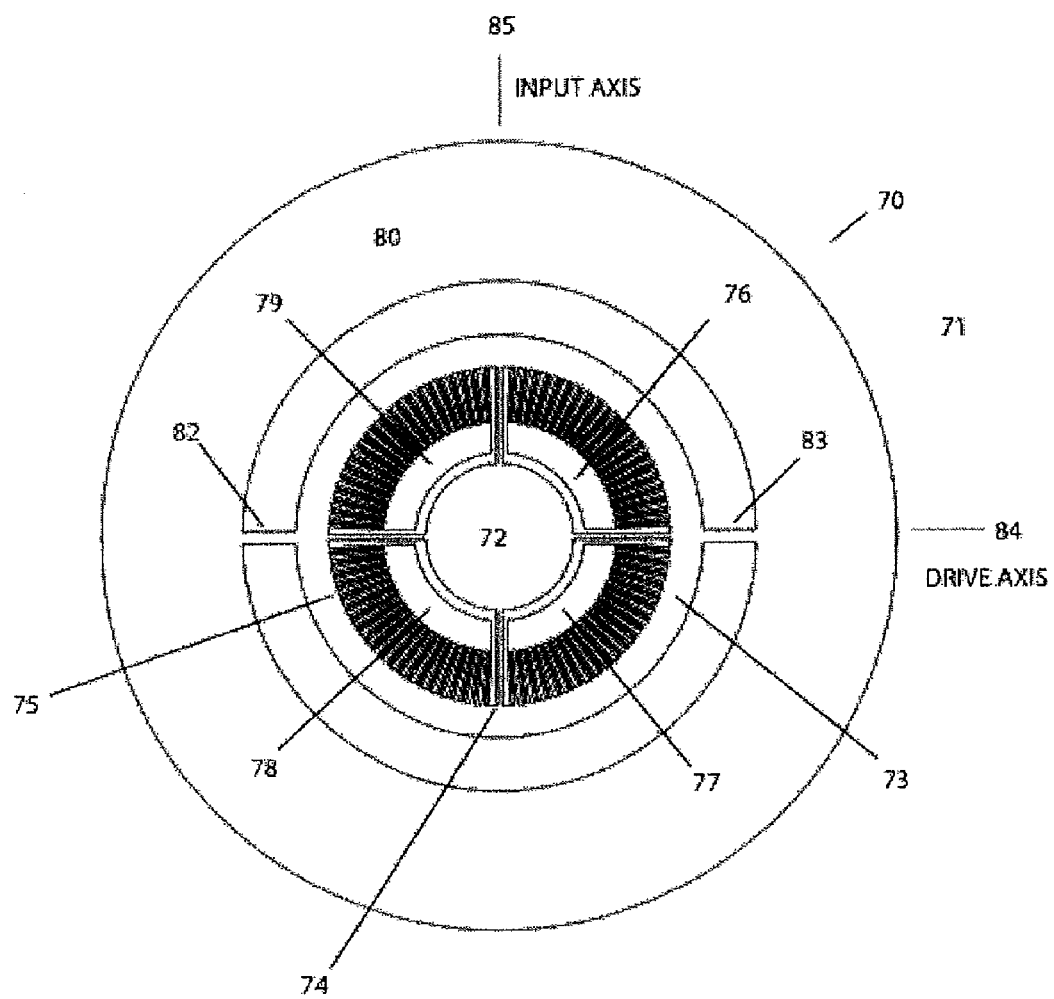
FIG. 8 is a top view of an alternative preferred embodiment of the invention, showing a G2-Out Gyroscope mechanical design.
Figure 9:
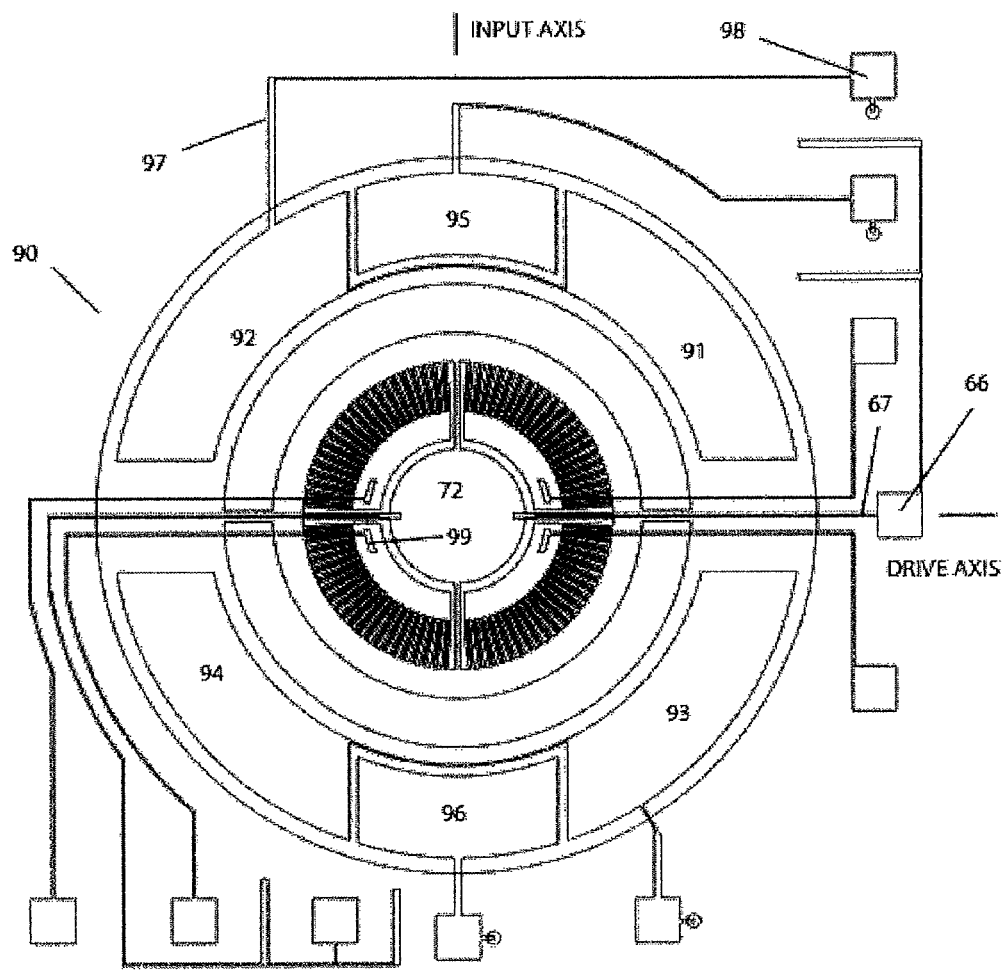
FIG. 9 is a schematic representation of the metallization design for the G2-Out Gyro embodiment of FIG. 8.

The G2-Out Gyroscope 70, FIGS. 8 and 9, is a variation on the G2-Gyroscope where the Gyro Member 80 is the structural outer member, and the Gyro Member is driven directly about the Drive Axis 84. The Output Axis is still normal to the plane. The alignments of the Drive Axis and Input Axis 85 are as specified with the G2 Gyroscope.

Mechanical Design of the G2-Out Gyroscope

The mechanical design of the G2-Out gyro embodiment of the invention is described with FIG. 8. The gyro is mounted to the Pyrex substrate 71 via the mounting post 72 in the center. Ring structure 73 is attached to central post 72 with four radial flexures 74. The radial flexures allow oscillation of the gyro about the Output Axis (normal to the plane). From the ring is attached the rotor 75 of the capacitive rotary comb sensor. The fingers of the rotor extend radially towards the center of rotation. Four radial comb stators 76, 77, 78, 79 are mounted to the Pyrex substrate. The fingers of each stator extend outwards in between the rotor fingers. The radial comb sensor design is identical to the component used for the G2-Gyro.

The ring structure 73 is connected to the disk 80 with two torsional flexures 82, 83. These flexures allow oscillation of the GM about the Drive Axis.

Metallization Design of the G2-Out Gyroscope

The metallization design is similar to that of the G2-Gyro. Plates located beneath the GM disk are used to actuate and sense the motion of the disk about the Drive Axis. Unlike the G2-Gyro, however, the GM is driven directly by the actuator plates. This can lead to direct drive of the disk about the Output Axis (quadrature error). The benefit is that the disk of the G2-Out Gyro is much larger, allowing for greater sensitivity since the inertia is greater.

The metallization design 90 is shown in FIG. 9. It consists of capacitive plates, conductor traces and pads. Capacitive plates 91 and 92 are located under part of the GM disk on one side of the Drive Axis. They are connected by a trace. Capacitive plates 93, 94 are located on the other side. They are connected by a trace. Drive voltages are applied to the actuator plates to predominantly pull down on one side of the disk during the first half of the drive cycle and to predominantly pull down on the other side of the disk during the second half of the drive cycle. The result is an oscillatory motion of the GM disk about the Drive Axis. The sensing of the GM disk motion about the Drive Axis is accomplished with two capacitive plates 95, 96. The outputs are connected differentially since for any motion, the gap for one increases and the gap for the other decreases.

Trace 97 connects capacitive plates 91, 92 to pad 98, for example.

Stators of the rotary comb are connected to pads with traces 99 that are crimped between the stator structure and the Pyrex substrate during anodic bonding. The monolithic gyro structure is connected to pad 66 by trace 67 crimped between the mounting structure 72 and the Pyrex substrate. The preferred electrical connection of the monolithic gyro structure is to ground.

Traces are in themselves capacitive sensing plates when they are located beneath the moving structure and this needs to be taken into consideration. A rule is to make the lengths under the moving parts equal and symmetric. Pick-up between plates is also a consideration. The usual design practices apply. Electrical pick-up can be a source of quadrature in the gyro output.

G2-Out Gyro Operation

For the operation of the G2-Out Gyro, the GM is oscillated about the Drive Axis. With Input Rate applied about the Input Axis, the GM disk also oscillates about the Output Axis. The rotary comb sensor measures the output motion of the GM.

DESCRIPTION Of PREFERRED ELECTRONICS

Figure 10:
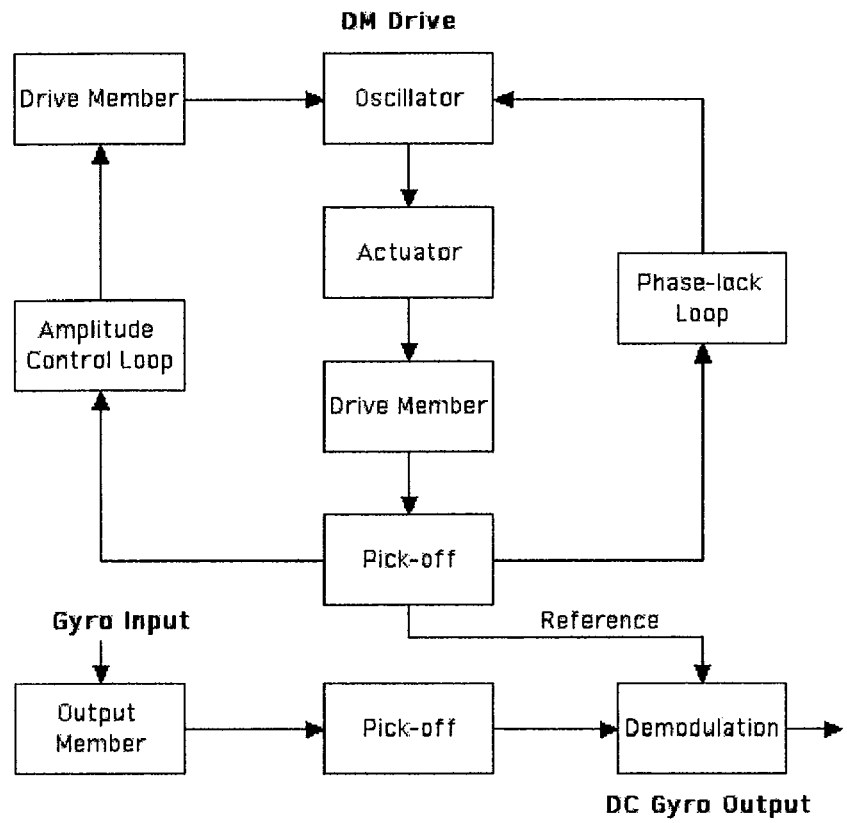
FIG. 10 is a schematic diagram of the preferred electronics for operation of the inventive G2-Gyroscope.

The preferred electronics for the various embodiments of the invention can be described schematically with FIG. 10. An oscillator generates an AC voltage with a frequency close to the DM resonant frequency. The AC voltage is added to a DC bias voltage greater than the AC amplitude to develop a sinusoidal drive waveform. The drive voltage is applied to a set of capacitor plate actuators to drive the DM into oscillation. A set of capacitor plates under the DM is used to sense the motion of the DM about the Output Axis. A Phase-lock loop acts on the phase of the DM signal to keep the DM on-resonance by varying the oscillator frequency. An amplitude control loop compares the DM signal voltage to a reference voltage and varies the AC drive voltage to maintain the DM amplitude constant.

Input rotation rate generates an oscillation of the Gyro Member about the Output Axis with an amplitude that is proportional to the rotation rate. By demodulating the AC output signal with a reference waveform, the gyro output is converted to a DC voltage that is proportional to rotation rate. The gyroscope is operated open-loop.

DISSOLVED WAFER PROCESSING

Dissolved Wafer Processing (DWP) is a MEMS fabrication process for making relatively large parts with good flatness and square profiles. The process requires two wafers: the first Pyrex and the second silicon, with a Boron-doped epitaxial layer. The combination of materials enables the two wafers to be anodically bonded. The thickness of the epitaxy determines the final device thickness, while Boron doping of the epitaxial layer inhibits EDP etching.

Typical dimensions include: device size of about 3 mm in the plane, device thickness of 40 microns, smallest flexure thickness of 5 microns and gaps between comb fingers of 5 microns.

Four process masks are needed: two for processing the silicon and two for the Pyrex. Instrument functions are distributed between the two layers: the mechanical structure and stator comb components are fabricated in the doped silicon layer and the electrical connections and flat capacitive plate components are deposited onto the Pyrex layer.

Process Steps

Figure 11:
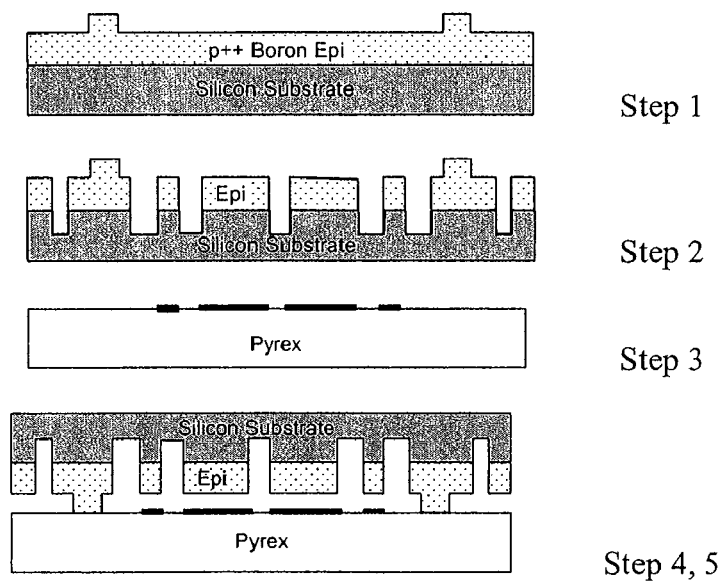
FIG. 11 schematically depicts the dissolved wafer process steps for the preferred manner of fabricating the inventive gyro.
Figure 12:
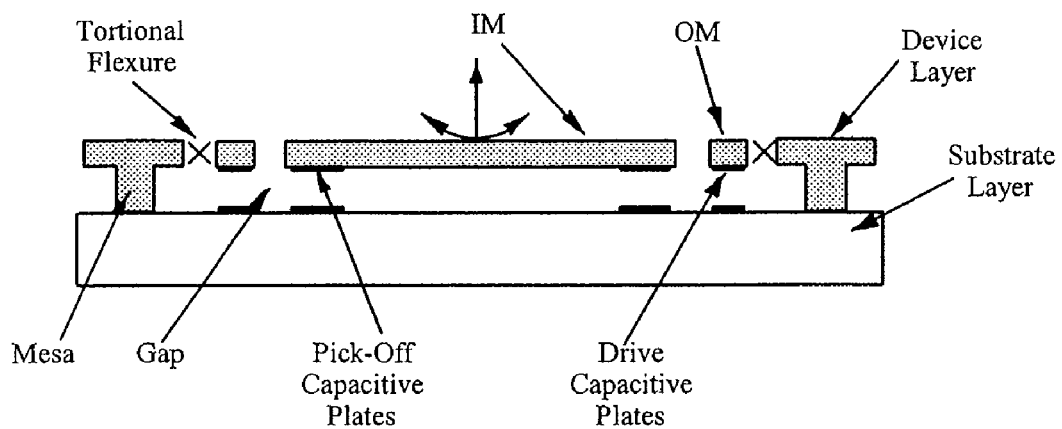
FIG. 12 is a schematic side-view of the completed device from FIG. 3 after the silicon is etched by EDP.

The process steps are described with FIG. 11. The starting silicon wafer includes a grown epitaxial layer with heavy boron diffusion of 43-micron thickness. In step 1, the epitaxial layer is etched to form mesas that support the silicon structures on the Pyrex as patterned by Mask 1. The mesa thickness also sets part of the gap between the device and the substrate that allows motion of parts. In step 2, deep reactive ion etching is used to etch through the epitaxial layer to form the device geometry that includes the structure, mass and combs as patterned with Mask 2. In step 3, wells are formed in the Pyrex to form the rest of the required gap using Mask 3. With Mask 4 (step 4), metal deposited on the Pyrex is patterned to form capacitive plates for driving and sensing out of plane motions. In addition, it patterns traces (conductors) that connect the structure, capacitive plates and the comb stators to the pads. In step 5, the silicon wafer is anodically bonded to the Pyrex wafer at the mesas. In step 6 the wafer is cut with a saw along outlines (streets) that separate devices. Each device is then EDP (Ethylene-Diamene-Pyrocatechol) etched to remove the silicon, leaving behind epitaxial devices with movable parts. The thickness of the devices is equal to the epitaxial thickness minus the mesa thickness, approximately 40 microns for the present devices. A conceptual side view of the finished device is shown in FIG. 12.

Advantages/Disadvantages of DWP

DWP has Several Advantages:
- devices are made of one material (doped silicon) for greater thermal stability,
- Pyrex serves as a robust substrate since it can be made as thick as desired,
- multiple devices can be fabricated on the same Pyrex substrate, while making them physically separate,
- thicker doped silicon devices can be made subject to the epitaxial process,
- the process is a relatively low-temperature process, thereby generating low internal stresses.

The disadvantages of DWP are not limiting, but can contribute to cost of fabrication and greater design complication. They include:
- epitaxial growth limits the device thickness and introduces stresses,
- chemical etching of most of the silicon wafer by EDP,
- induced stresses from differential expansion of the silicon and Pyrex from the anodic bonding operation, and
- reactive ion etching produces some tapering which makes it difficult to attain a desired resonant frequency.

A particularly critical requirement is the formation of flexures with precise geometry having a rectangular cross-section. A small variation in the wall verticality can greatly affect the stiffness and hence the dynamics. A conical cross-section would also have the effect of changing the rotation axis of the GM, and perhaps the orthogonality between the DM and GM axes. This misalignment leads to "quadrature error" in gyroscopes.

DERIVATION Of The EQUATION Of MOTION

The analysis prescribed by J. S. Ausman (G. R. Pitman, Jr., Editor, *Inertial Guidance*, University of California Engineering and Physical Sciences Extension Series, J. Wiley and Sons, Inc., New York, 1962, J. S. Ausman, ch. 3) for the gimbal structure of the Single-Degree-of-Freedom Gyroscope is applicable to the common structure of the G2-Gyro.

The fundamental equation applied is that the rate of change of angular momentum is equal to the applied torque:

$$\overline{L} = \left(\frac{d\overline{H}}{dt}\right)_I \tag{15}$$

This is Newton's second law in rotational form. In equation (15) $(d\overline{H}/dt)_I$ is the time rate of change of $\overline{H}$, the angular momentum vector, with respect to inertial space, while $\overline{L}$ represents the applied torque vector. When equation (15) is applied to the GM we get $$\left(\frac{d\overline{H}_{GM}}{dt}\right)_I = \left(\frac{d\overline{H}_{GM}}{dt}\right)_{GM} + \overline{\omega} \times \overline{H}_{GM} = \overline{L}_{GM} \tag{16}$$

where $\overline{H}_{GM}$ is the angular momentum of the GM, $$\left(\frac{d\overline{H}_{GM}}{dt}\right)_{GM}$$

is the time derivative of $\overline{H}_{GM}$ relative to the s, i, o coordinate system, and $\overline{\omega}$ is the angular velocity of the GM or s, i, o coordinate system in inertial space.

The GM angular momentum, $\overline{H}_{GM}$, is given by $$\overline{H}_{GM} = \overline{I}_{GM} \cdot \overline{\omega} \tag{17}$$

where ŝ is a unit vector in the s direction. $\overline{I}_{GM}$ is the moment of inertia tensor of the GM.

Calculate $\overline{\omega}$

Since the GM is mounted to the DM, which is mounted to the case, the angular velocity of the GM in inertial space is given by the angular velocity of the GM gimbal, measurable relative to the DM, plus the motion of the DM, measurable relative to the case, plus the motion of the case. This is expressible as a vector sum of the separate angular velocities $$\overline{\omega} = \overline{\omega}_{s,i,o} + \vec{\omega}_{x,y,z} + \overline{\omega}_{a,b,c} \quad (18)$$

$$= \dot{\theta}\hat{o} + \dot{\phi}_x\hat{x} + \dot{\phi}_y\hat{y} + \dot{\phi}_z\hat{z} + \dot{\gamma}_a\hat{a} + \dot{\gamma}_b\hat{b} + \dot{\gamma}_c\hat{c}$$

where $\theta, \phi, \gamma$ are angles of rotation for the GM, DM and case (or vehicle) axes, respectively. $\dot{\theta}$ relates that the motion of the GM is only about the o-axis. Further, we expect that the motion of the DM will only be about the y-axis, therefore, $$\overline{\omega} = \dot{\theta}\hat{o} + \dot{\phi}_y\hat{y} + \dot{\gamma}_a\hat{a} + \dot{\gamma}_b\hat{b} + \dot{\gamma}_c\hat{c} \quad (19)$$

The motion of the vehicle is unconstrained in inertial space.

Since we are interested in the motion of the GM in the s,i,o frame, we need to convert the latter terms in equation (19). We know the relationship between the s,i,o and x,y,z frames is a rotation about the o-axis. We apply the rotational transformation:

$$\hat{x} = \hat{s}\cos\theta - \hat{i}\sin\theta \cong \hat{s} - \hat{i}\Theta$$

$$\hat{y} = \hat{i}\cos\theta + \hat{s}\sin\theta \cong \hat{i} + \hat{s}\theta \quad (20)$$

$$\hat{z} = \hat{o}$$

Since the GM is held at null, only small motions need to be considered, hence the small angle approximation is used.

We also know that the DM can only rotate about the y-axis, therefore the two axes are related by the rotational transformation:

$$\hat{a} = \hat{x}\cos\phi - \hat{z}\sin\phi \cong \hat{x} - \hat{z}\phi$$

$$\hat{b} = \hat{y} \quad (21)$$

$$\hat{c} = \hat{x}\sin\phi + \hat{z}\cos\phi \cong \hat{x}\phi + \hat{z}$$

The DM motion is also small hence the small angle approximation is again used. Substituting the rotations (20) and (21) into (19), we get $$\overline{\omega} = \omega_s\hat{s} + \omega_i\hat{i} + \omega_o\hat{o} \quad (22)$$

where $$\omega_s = (\theta\dot{\phi}_y + \dot{\gamma}_a + \theta\dot{\gamma}_b + \phi\dot{\gamma}_c),\ \omega_i = (\dot{\phi}_y - \theta\dot{\gamma}_a + \dot{\gamma}_b - \theta\phi\dot{\gamma}_c),\ \omega_o = (\dot{\theta} - \phi\dot{\gamma}_a + \dot{\gamma}_c) \quad (23)$$

Calculate $\overline{H}_{GM}$

The moment of inertia tensor for the GM is given by $$\overline{\overline{I}} = \begin{pmatrix} I_s & 0 & 0 \\ 0 & I_i & 0 \\ 0 & 0 & I_o \end{pmatrix} \quad (24)$$

assuming s, i, o are the principal axes of inertia for the GM. If s, i, o are not principal axes of inertia, it will generally be most convenient first to compute the vector components of $\overline{\overline{I}}\cdot\overline{\omega}$ along a set of principal axes and then to transform the vector $\overline{\overline{I}}\cdot\overline{\omega}$ into the s, i, o coordinate system. We assume that our designs have the appropriate symmetries.

Multiplying equation (22) by the moment of inertia tensor (24), and substituting into equation (17) gives $$\overline{H}_{GM} = \overline{\overline{I}} \cdot \overline{\omega} \quad (25)$$

$$= \begin{pmatrix} I_s & 0 & 0 \\ 0 & I_i & 0 \\ 0 & 0 & I_o \end{pmatrix} \cdot (\omega_s\hat{s} + \omega_i\hat{i} + \omega_o\hat{o})$$

$$= I_s\omega_s\hat{s} + I_i\omega_i\hat{i} + I_o\omega_o\hat{o}$$

$$= H_{IMs}\hat{s} + H_{IMi}\hat{i} + H_{IMo}\hat{o} \quad (26)$$

where $H_{IMs} = I_s\omega_s$, $H_{IMi} = I_i\omega_i$, $H_{IMo} = I_o\omega_o$ (27)

Calculate $\overline{\omega} \times \overline{H}_{GM}$

The expression $\overline{\omega} \times \overline{H}_{GM}$ is given by $$\overline{\omega} \times \overline{H}_{GM} = \begin{vmatrix} \hat{s} & \hat{i} & \hat{o} \\ \omega_s & \omega_i & \omega_o \\ H_{GMs} & H_{GMi} & H_{GMo} \end{vmatrix} \quad (28)$$

$$= (\omega_i H_{GMo} - \omega_o H_{GMi})\hat{s} - (\omega_s H_{GMo} - \omega_o H_{GMs})\hat{i} + (\omega_s H_{GMi} - \omega_i H_{GMs})\hat{o}$$

We will restrict ourselves to the o-axis solution since we will assume that motions of the GM about the other axes do not occur.

$$(\overline{\omega} \times \overline{H}_{GM})_o = \omega_s H_{GMi} - \omega_i H_{GMs} \quad (29)$$

$$= \omega_s I_i \omega_i - \omega_i I_s \omega_s$$

$$= \omega_s \omega_i I_i - \omega_s \omega_i I_s$$

$$= (I_i - I_s)\omega_s \omega_i$$

Calculate $$\frac{dH_{GMo}}{dt} + (\overline{\omega} \times \overline{H}_{GM})_o$$

to get the equation of motion.

$$\frac{dH_{GMo}}{dt} + (\overline{\omega} \times \overline{H}_{GM})_o = I_o\dot{\omega}_o + (I_i - I_s)\omega_s\omega_i \quad (30)$$

Substituting for $\omega_o$, $\omega_i$, $\omega_s$ and adding damping and spring terms to the motion of the GM, as well as the pendulous torque, we get the full GM Equation of Motion. The variables for the angles can change in rotational or oscillatory mode or both.

$$I_{GMo}\ddot{\theta} + D_{GM}\dot{\theta} + [K_{GM} + (\dot{\phi}_y^2 + \dot{\phi}_y\dot{\gamma}_b - \dot{\gamma}_a^2 - \phi\dot{\gamma}_a\dot{\gamma}_c + \dot{\phi}_y\dot{\gamma}_b + \dot{\gamma}_b^2 - \phi\dot{\gamma}_a\dot{\gamma}_c - \phi^2\dot{\gamma}_c^2)\Delta I]\Theta - (\dot{\phi}_y\dot{\gamma}_a + \phi\dot{\phi}_y\dot{\gamma}_c + \dot{\gamma}_a\dot{\gamma}_b + \phi\dot{\gamma}_b\dot{\gamma}_c)\theta^2 = I_{GMo}(\phi\ddot{\gamma}_a + \phi\ddot{\gamma}_a - \ddot{\gamma}_c) - \Delta I(\dot{\phi}_y\dot{\gamma}_a + \dot{\gamma}_a\dot{\gamma}_b + \phi\dot{\phi}_y\dot{\gamma}_c + \phi\dot{\gamma}_b\dot{\gamma}_c) \quad (31)$$

Note that: $\phi = \phi_y$, $\Delta I_{GM} = I_{GMi} - I_{GMs}$ where

θ GM rotation angle relative to the DM,

φ DM rotation angle relative to case, $\gamma_a, \gamma_b, \gamma_c$ case rotation angles.

Making substitutions for $\phi$ and $\dot\phi=\omega\bar\phi \cos \omega t$ and $\dot\gamma_a=\Omega_a$, $\dot\gamma_b=\Omega_b, \dot\gamma_c=\Omega_c$, we get the final form for the equation of motion with all the angular rotation dependences.

$$I_{GM_o}\ddot\theta+D_{GM}\dot\theta+[K_{GM}+\{(\Omega_b^2-\Omega_a^2)+\tfrac{1}{2}(\omega^2-\Omega_c^2) \\ \bar\phi^2-2\Omega_a\Omega_c\bar\phi \sin \omega t+2\Omega_b\bar\phi\omega \cos \omega t\}\Delta I]\Theta- \\ (\Omega_a\Omega_b+\Omega_a\Omega_c\bar\phi \sin \omega t+\Omega_a\bar\phi\omega \cos \omega t)\theta^2=I_{GM_o}\Omega_a \\ \bar\phi\omega \cos \omega t-\Delta I(\Omega_a\Omega_b+\Omega_b\Omega_c\bar\phi \sin \omega t+\tfrac{1}{2}\Omega_c \sin \\ 2\omega t+\Omega_a\bar\phi\omega \cos \omega t) \quad (32)$$

BIAS MEASUREMENT

Carousel Method

The carousel method was first implemented by Delco to separate bias from the signal for in-plane instruments of an IMU consisting of two in plane gyroscopes and two in-plane accelerometers. The IMU was used in the Titan IIIC Space launch Vehicle. The performance result was orders of magnitude improvement in gyro and accelerometer bias stability. The approach used was to carousel the platform containing the instruments so that the Input Axis of the in-plane instruments were rotated about a Carousel Axis.

The rotation had the effect of modulating the signal in the presence of the bias (during the period of rotation). The peak-to-peak excursion of the signal was then related to the input rate. This technique proved effective with a low carousel rate because the larger instruments were and are much more stable than MEMS instruments. Therefore only long-term drift needed to be eliminated for the larger instruments. For MEMS instruments, however, in addition to long-term drift, there is a prominent 1/f bias instability, which limits performance. The solution of the invention is to carousel at a larger rotation rate to eliminate the bias drift and the 1/f bias instability.

Relation of Bias Instability to Allan Deviation Analysis

Figure 13:
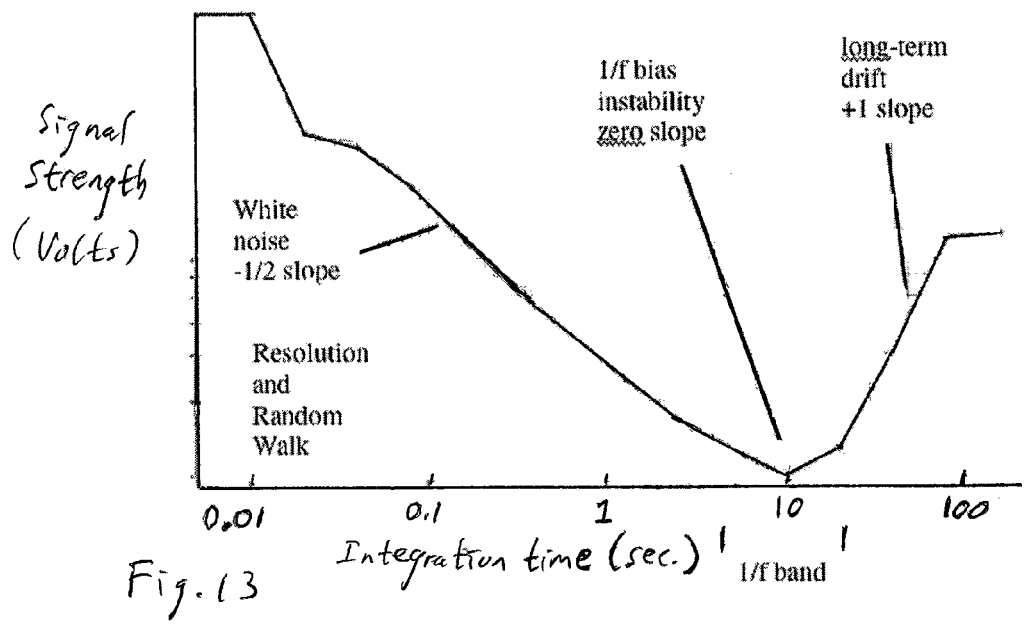
FIG. 13 is a graph of an Allan Deviation analysis and its relationship to 1/f bias instability and bias drift.

The carousel rate necessary for MEMS instruments can be related to the Allan Deviation analysis used to quantize bias instability, white noise and long-term drift as shown in FIG. 13. The white noise is shown as the $-\tfrac{1}{2}$ slope characteristic. In the analysis, as the integration time is increased, the white noise magnitude is decreased with maximum resolution available at the bottom of the characteristic. The white noise also determines the angle random walk for the gyroscope and the velocity random walk for the accelerometer. The bias instability is the level of the zero slope characteristic, which is due to 1/f noise, originating primarily in the electronics. The +1 slope characteristic rises to the right at the larger integration times. This characteristic is due to long-term drift. Long-term drift is primarily due to device instability influenced by temperature changes, stress and aging. From the integration times can be calculated the carousel rate. By increasing the carousel rate, the long-term and 1/f instability can be reduced in the output signal. The maximum, practical rotation rate is the value that results in only the white noise characteristic. The minimum rotation rate depends on the intersection of the white noise and 1/f characteristics. An even larger rate would not appreciably reduce the bias instability but may aid the signal processing.

Figure 14:
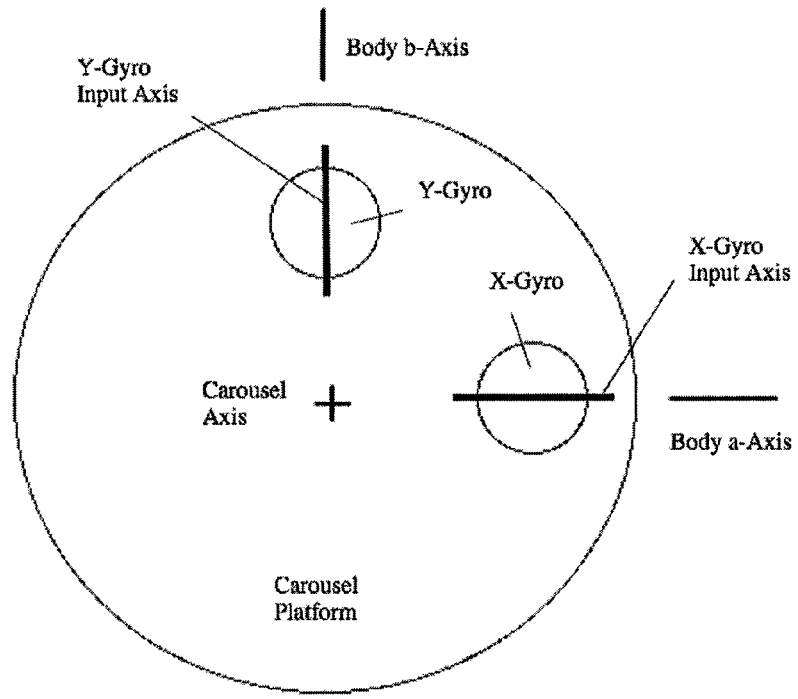
FIG. 14 is a top schematic view of a carousel mechanization with two in-plane gyroscopes.

Carousel Mechanization for a Planar IMU (FIG. 14)

The planar IMU contains X, Y and Z-gyroscopes. The IMU is co-planar with the carousel platform. The Z-Gyro is aligned with the Carousel Axis. The Input Axes of the X, Y gyroscopes (in-plane gyros) are orthogonal and lie in the plane of the platform. The carousel motion is intended to stabilize the X, Y gyroscopes (and accelerometers). The Input Axes of the X, Y gyros are also co-planar with two orthogonal Body Axes (a-Axis and b-Axis) of the vehicle as shown in FIG. 2. The Body Axes are fixed to the vehicle and the X, Y Axes rotate with the Input Axes of the X, Y gyroscopes. As the carousel rotates, the Input Axes of the two orthogonal gyroscopes rotate in the plane of the platform and about the Carousel Axis.

For the case of the X-gyro and a single input rate, about the Body a-Axis, the signal of the X-gyro is at peak value when its Input Axis is aligned with the a-Axis. The signal is zero when aligned with the b-Axis (no rate) and is at the minus peak value when aligned with the negative a-Axis. The signal is therefore modulated as the cosine of the carousel angle with respect to the a-Axis (constant amplitude if the input rate is constant). For the Y-gyro the modulation is sinusoidal with respect to the a-Axis.

Figure 15:
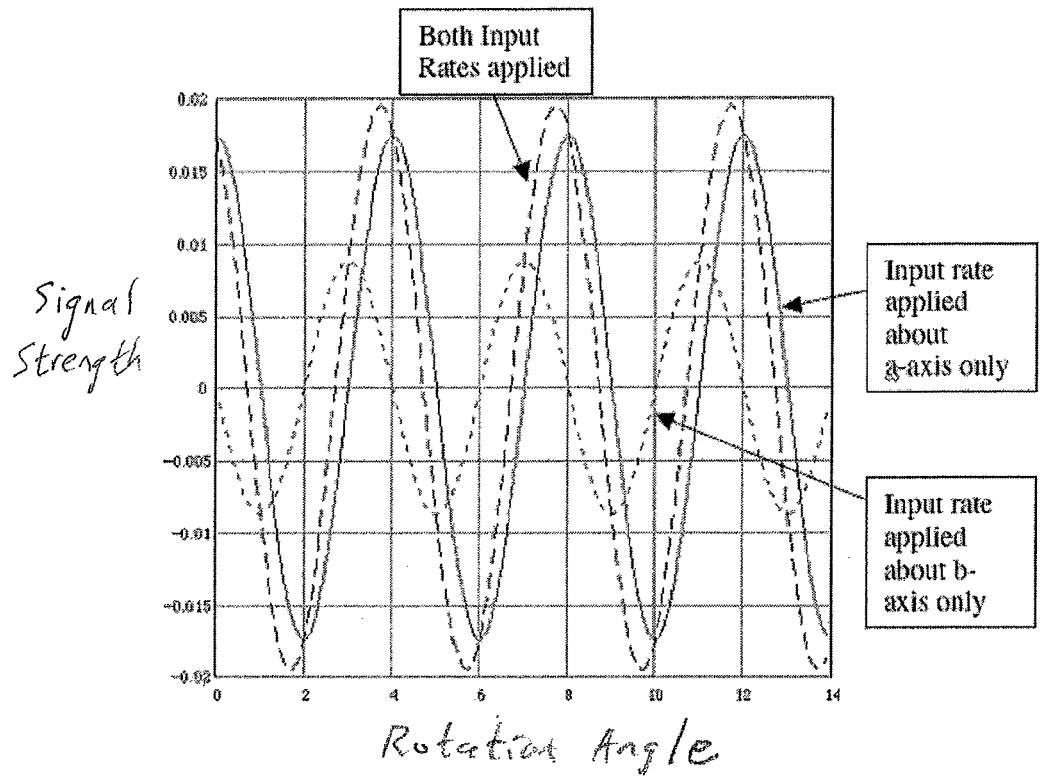
FIG. 15 is a graph showing sample signal waveforms generated during rotation of the carousel shown in FIG. 14.

For the case of two input rates, about the Body a-Axis and the Body b-Axis, the rotating X-gyroscope will sense both Input Rates, as will the rotating Y-gyroscope. In FIG. 15, are shown graphically, two separate signals from two input rates phase shifted by 90 degrees of rotation angle. The sum shows an oscillation with a different amplitude and phase.

For the case of two input rates and with both the X and Y-gyroscopes operating at the same time, an equal but phase-shifted sum is obtained.

The same discussion applies for in-plane accelerometers.

Carousel Algorithm

The function of the algorithm is to separate the components of the sum gyro signal from each input rate about the two body axes. This is done by mixing the sum signal with two waveforms, phase-shifted by 90 degrees that are referenced to the Body a-Axis and b-Axis. A resolver (pick-off) is used to measure the rotation angle of the carousel to obtain the reference waveforms.

Figure 16:
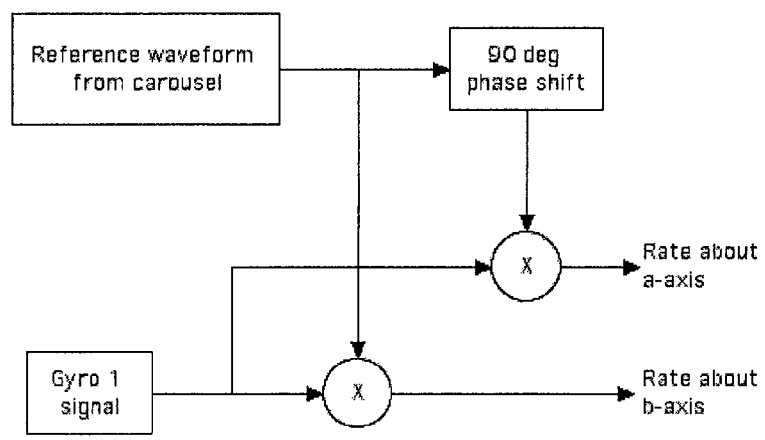
FIG. 16 is a schematic of an algorithm for separating signals from orthogonal input rates.

The schematic of FIG. 16 shows that the signal from the X-gyro is split. The waveform referenced with the a-Axis is then mixed with the signal to obtain the input rate about the a-Axis. The second waveform, shifted by 90 degrees from the first, is mixed with the gyro signal to obtain the input rate about the b-Axis. This is the phase-sensitive detection method as used in lock-in analyzers.

The reference waveforms can be square-wave or sinusoidal.

In summary, carousel rotation is used to modulate the gyro signal and phase-sensitive detection is used to separate the gyro signal proportional to input rates about both Body a-Axis and b-axis.

To be effective, the carousel rate needs to be faster than the frequency of the instability. For the 1/f instability, the carousel rate should be faster than the lowest integration time of the 1/f band in the Allan Deviation analysis. In effect, the gyro is made to sense input rate in a time duration that is shorter than the time it takes for the bias to change.

The lock-in technique (phase sensitive detection) was invented to improve the accuracy of measurements by speeding up the time in which the measurement is made, before the instability occurs. Or, equivalently, by shifting the measurement frequency beyond the drift and 1/f noise and into the white noise spectrum. This is the state of the art method used in all sensor systems: the measurand is excited at very high frequencies with a sinusoidal voltage (or square), the response occurs at the same frequency and it is measured, the high frequency signal is then demodulated with the same excitation waveform to obtain a dc value proportional to the input.

In the carousel application, the carousel motion excites the gyro at the carousel rate while it is measuring the input rate. The angle resolver (pick-off) is used to generate the reference waveform.

A requirement of the gyroscope and the accelerometer is that the instruments have the bandwidth to respond to the carousel rate.

The same discussion applies for in-plane accelerometers.

For the small angle, rotary oscillation, the nature of the oscillating signal is equivalent to the measurement of the peaks of the sinusoids. Because, the rotation angle is smaller, the modulation can be done at a higher frequency, aiding the phase-sensitive detection method.

In-Plane Gyro and Accelerometer, Requirements

It is important that the BRG Axis is orthogonal to the in-plane gyro otherwise it will sense the BRG oscillation. This also applies to the in-plane accelerometer.

It is important that the in-plane instruments are not affected or de-stabilized by the rotary oscillation. The G2-gyroscope described above has proven to be insensitive to cross-axis rotations.

The in-plane accelerometers will sense the rotary oscillation frequency as well as vehicle rotation about the Body c-Axis. Two accelerometers for each in-plane axis can be used to cancel the rotation dependent signal. If the carousel rate is maintained constant, then the rotation sensitivity becomes a large stable bias that is also filtered by the invention.

Single Instrument Bias Stabilization

A structural mechanism (BRG) is integrated with the MEMS gyro or accelerometer to stabilize the individual instrument. With the BRG, the gyroscope Input Axis is driven to oscillate about the BRG Axis (Z-axis) through a small angle. This mechanization also applies to the accelerometer.

In this approach the IMU can be designed a la carte with stable and regular instruments. Small angle oscillation is necessary for the MEMS instrument because the structure is formed with flexures.

Bias-Stabilized G2-Gyro

Figure 17:
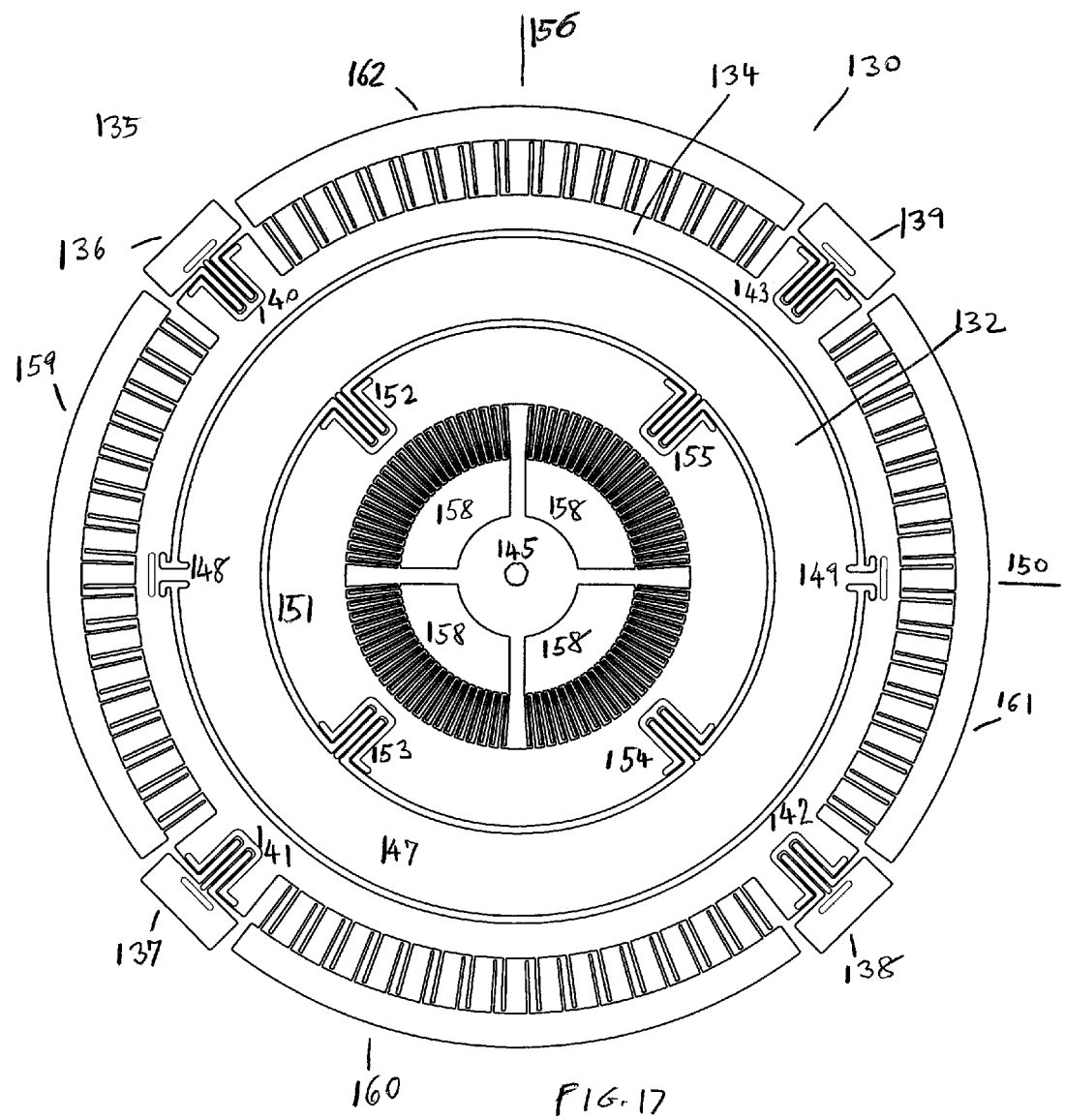
FIG. 17 is a schematic diagram of a Bias-Stabilized G2-Gyro of the invention.

The Bias-Stabilized G2-Gyro 130, FIG. 17, comprises the G2-Gyro 132 and an Integrated Bias Rotary Gimbal (BRG) 134. The BRG is suspended from the substrate 135 with four bonding pads 136, 137, 138, 139. A gap between the device and the substrate allow the members of the design to move (not shown). Four rotary flexures 140, 141, 142, 143 attach the BRG to the bonding pads and allow the BRG to rotate in the plane about the Z-Axis 145 (normal to the plane). The G2-Gyro Outer Member 147 is flexurally connected with two in-line torsional flexures 148, 149 to the BRG. These flexures define the Gyro Drive Axis 150, about which the Gyro Outer Member is driven into oscillation. The G2-Gyro Inner Member 151 is flexurally connected to the Gyro Outer Member with four radial flexures 152, 153, 154, 155. The Gyro Inner Member oscillates about the Gyro Output Axis (same as the Z-Axis) in response to the vehicle rotation about the Gyro Input Axis 156. The radial comb pick-off 158 measures oscillation of the Gyro Inner Member.

The BRG is driven to oscillate about the Z-Axis with two quadrants of the radial comb 159, 160. The angular amplitude of the BRG is measured with two other radial comb quadrants 161, 162. It is necessary to rotate the BRG to a precise and repeated angle amplitude.

Figure 18:
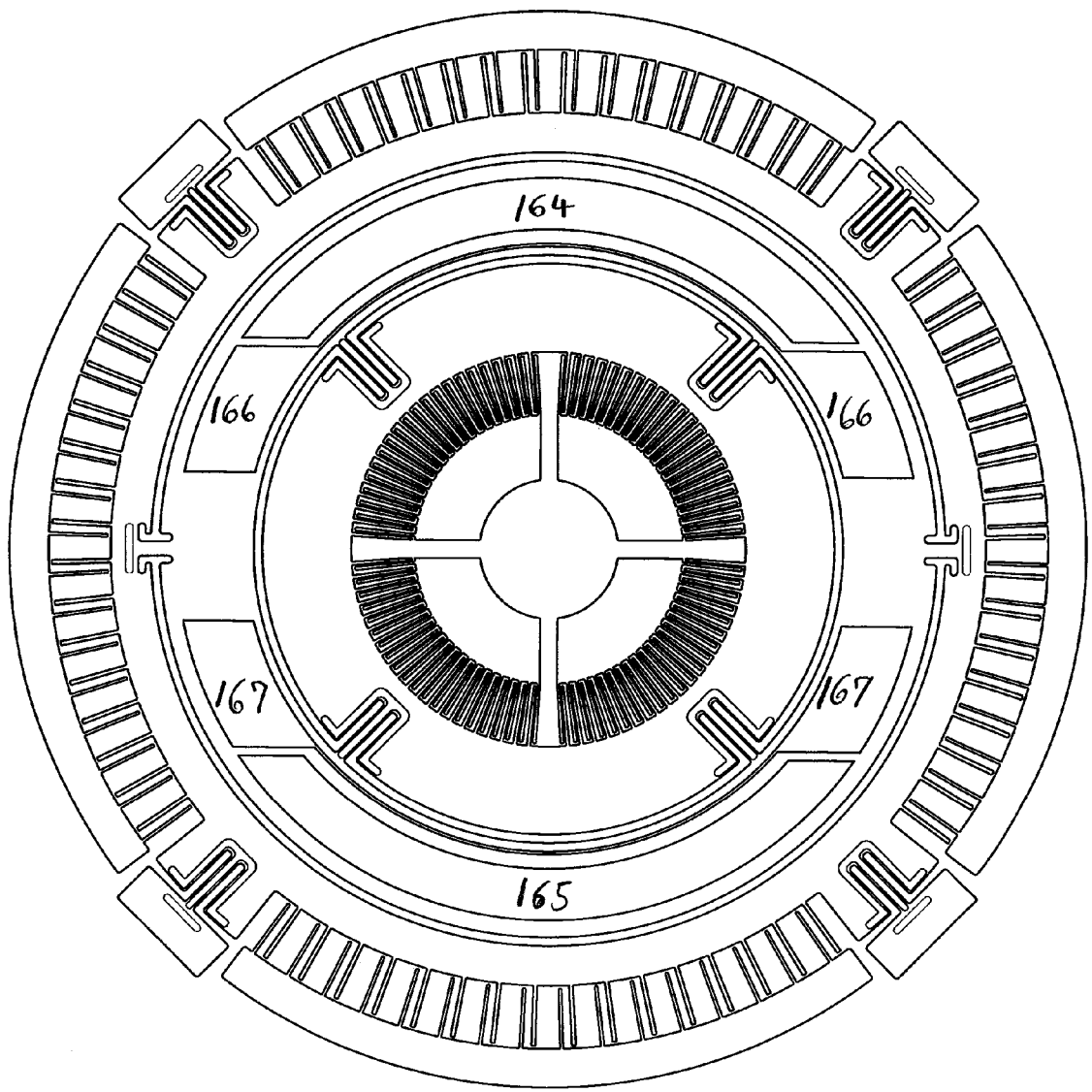
FIG. 18 is a schematic diagram of part of the drive and sense plates for the embodiment of FIG. 17.

In FIG. 18 are shown the planar capacitive plates to drive and sense the Gyro Outer Member. Plates 164, 165 are used to drive the Gyro Outer Member. Plates 166, 167 are used to sense the angular motion of the Gyro Outer Member.

Bias-Stabilized G1-Gyro

Figure 19:
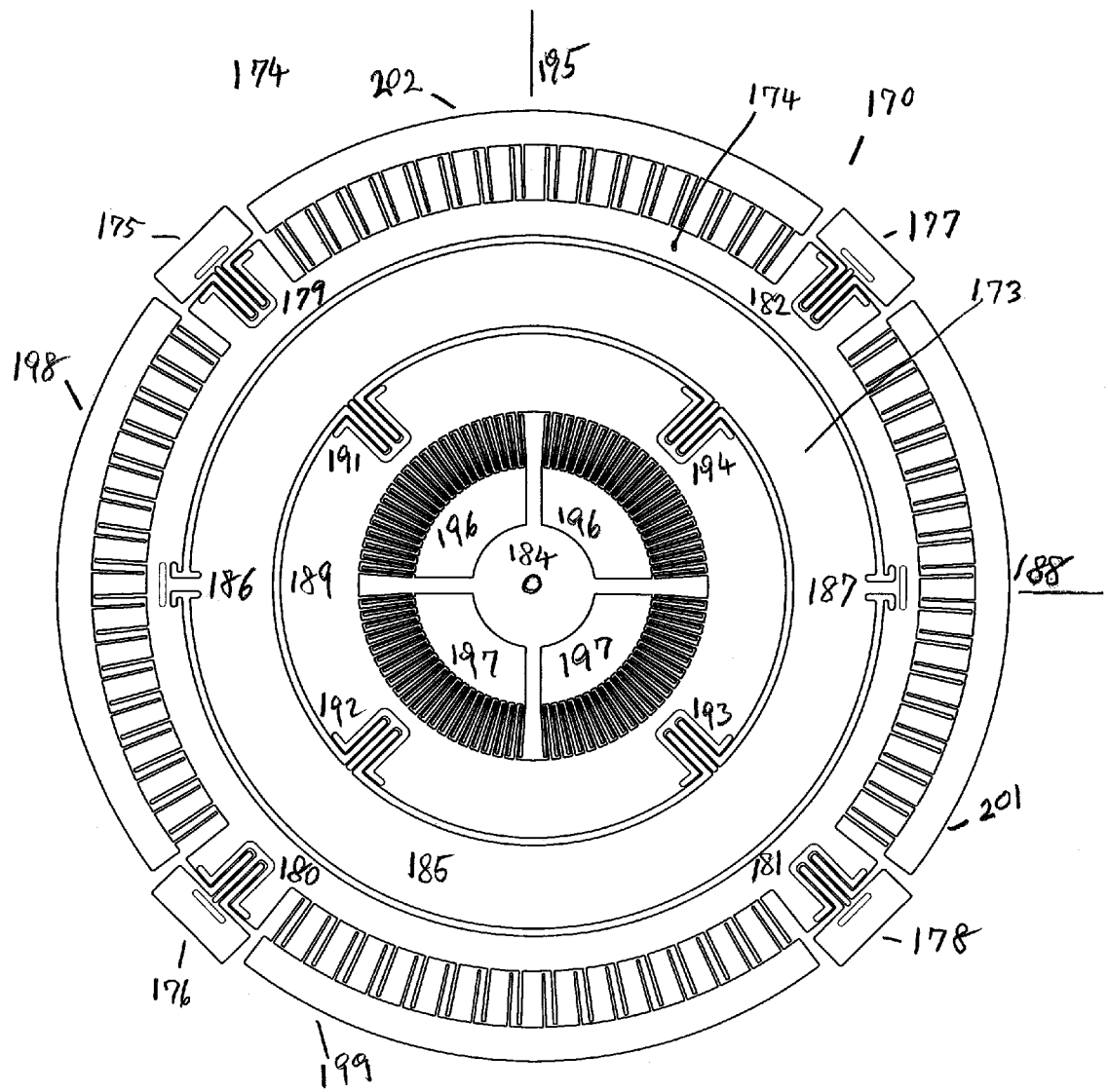
FIG. 19 is a schematic diagram of a Bias-Stabilized G1-Gyro of the invention.

The Bias-Stabilized G1-Gyro 170, FIG. 19, comprises the G1-Gyro 172 and an Integrated Bias Rotary Gimbal (BRG) 173. The BRG is suspended from the substrate 174 with four bonding pads 175, 176, 177, 178. A gap between the device and the substrate allow the members of the design to move (not shown). Four rotary flexures 179, 180, 181, 182 attach the BRG to the bonding pads and allow the BRG to rotate in the plane about the Z-Axis 184 (normal to the plane). The G1-Gyro Outer Member 185 is flexurally connected with two in-line torsional flexures 186, 187 to the BRG. These flexures define the Gyro Output Axis 188, about which the Gyro Outer Member oscillates in response to the vehicle rotation about the gyro Input Axis 195. The G1-Gyro Inner Member 189 is flexurally connected to the Gyro Outer Member with four radial flexures 191, 192, 193, 194. The Gyro Inner Member is driven to oscillate about the Gyro Drive Axis (same as the Z-Axis). The radial comb actuator comprising two quadrants 196 drive the Gyro Inner Member. The radial comb pick-off comprising two quadrants 197 sense the oscillation amplitude of the Inner Member.

The BRG is driven to oscillate about the Z-Axis with two quadrants of the radial comb 198, 199. The angular amplitude of the BRG is measured with two other radial comb quadrants 201, 202. It is necessary to rotate the BRG to a precise and repeated angle amplitude.

Figure 20:
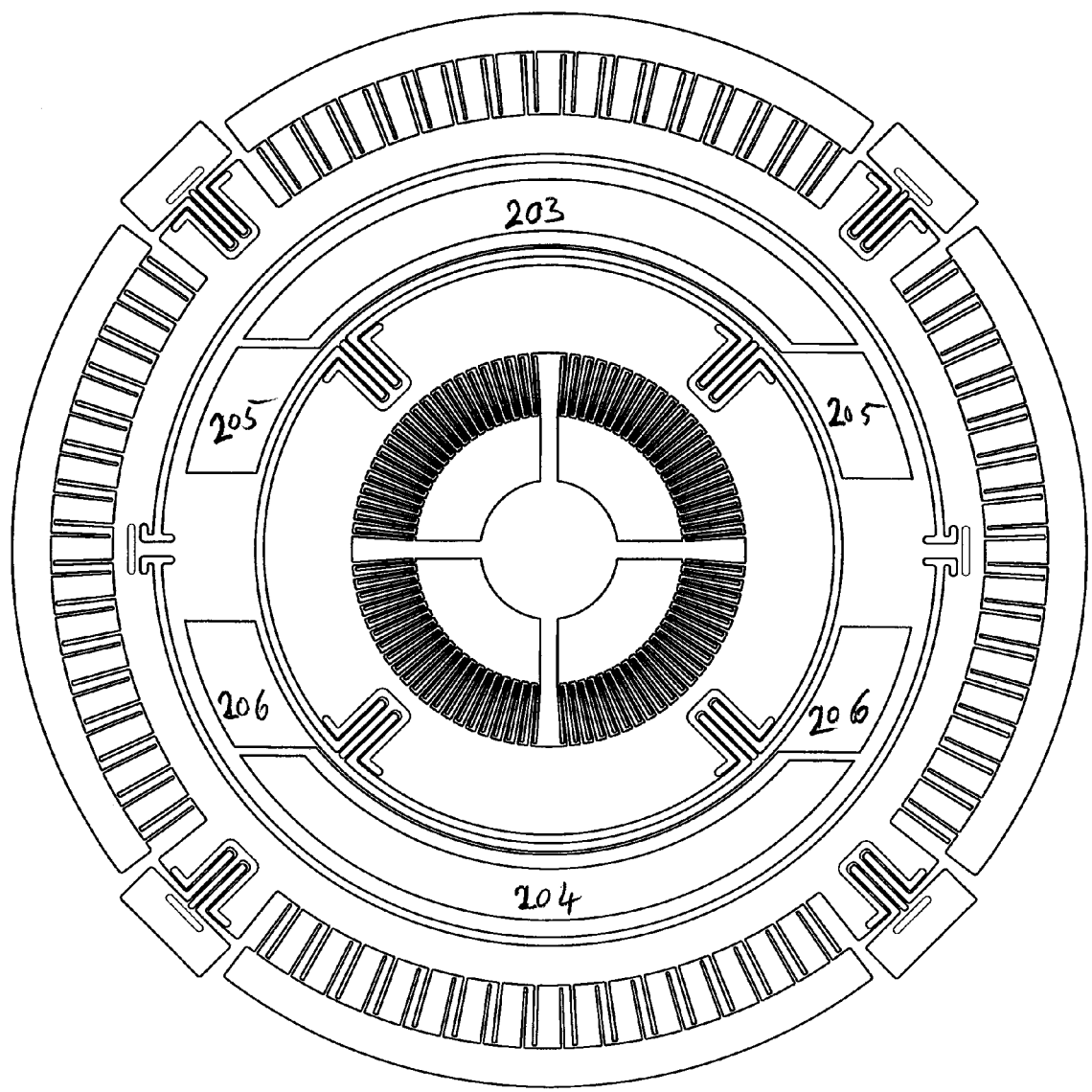
FIG. 20 is a schematic diagram of part of the drive and sense plates for the embodiment of FIG. 19.

In FIG. 20 are shown the planar capacitive plates to drive and sense the Gyro Outer Member. Plates 203, 204, 205, 206 are used to sense the gyro output oscillation.

Bias-Stabilized Linear Accelerometer

Figure 21:
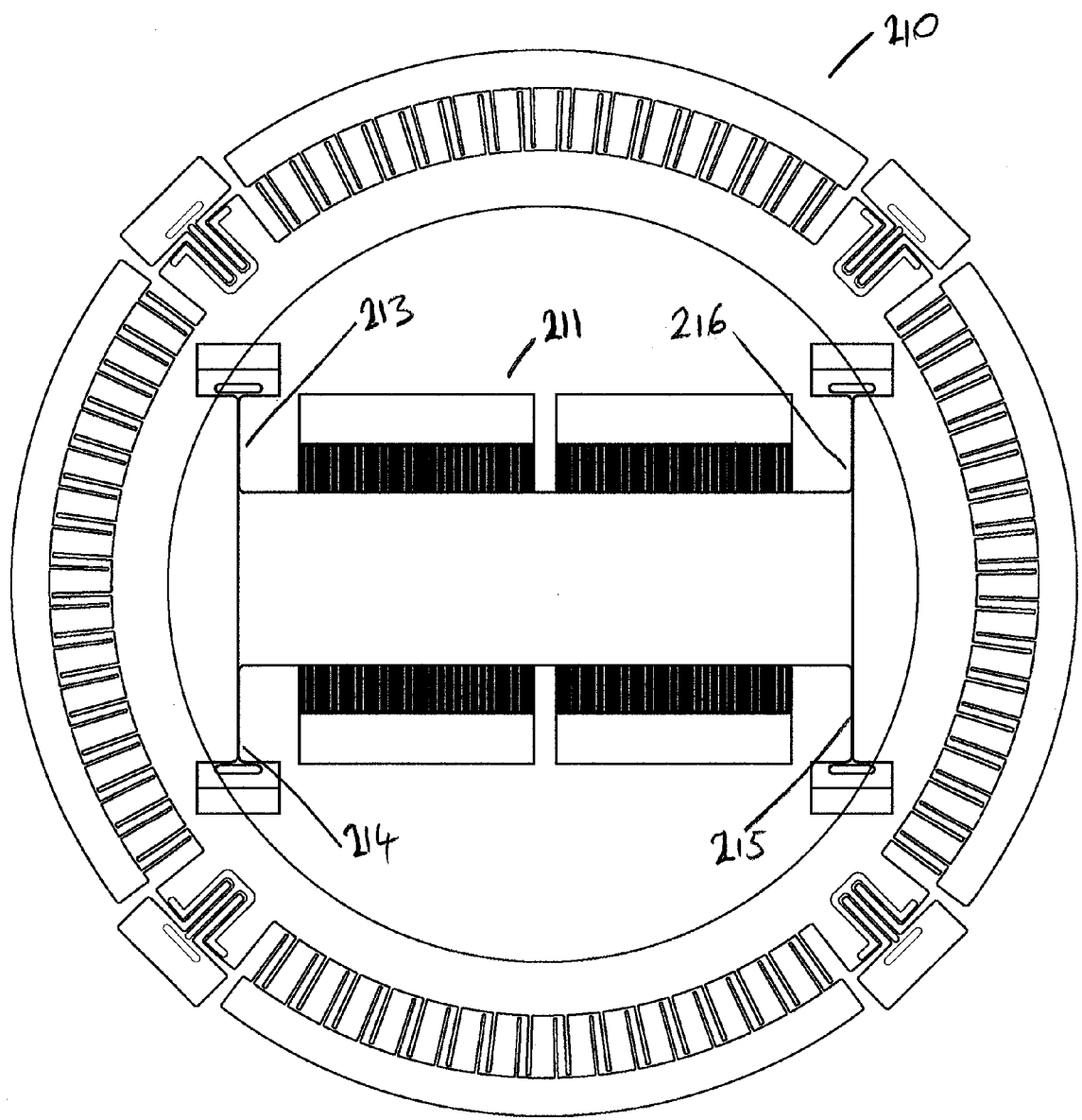
FIG. 21 is a schematic diagram of a Bias-Stabilized Linear Accelerometer of the invention.

The Bias-Stabilized Linear Accelerometer 210 (FIG. 21) comprises the same BRG as used for the G1-Gyro and the G2-Gyro. The linear accelerometer 211 is flexurally connected to the BRG with four linear bending flexures 213, 214, 215, 216.

Bias-Stabilized IMU

In this embodiment, a planar structure similar to the BRG is used to form an oscillating platform onto which the Planar IMU is mounted. The Planar Rotary Oscillating Platform (PROP) is flexurally mounted with radial flexures to the substrate. An actuator is used to oscillate it in angle and a pick-off is used to sense its motion.

Other Planar Gyroscopes:

In addition to the G1 gyroscope and G2 gyroscope, the invention applies to other planar gyroscopes having the Input Axis in the plane.

Specific features of the invention are shown in some drawings and not others, but this is not a limitation of the invention, the scope of which is set forth in the following claims. What is claimed is:

The invention claimed is:

1. A method for separating bias instability of a rotating MEMS gyroscope having an output signals from the gyroscope's output signal, in which the bias instability has a frequency, the method comprising:

(a) providing a bias-stabilized gyroscope that lies generally in a plane, for detecting rotation rate about a gyro input axis that lies in the plane, the gyroscope comprising:
a substrate defining a surface;
spaced bonding pads coupled to the substrate and projecting from the surface of the substrate;
a generally planar gimbal spaced from and essentially parallel to the surface of the substrate and flexibly coupled to the bonding cads by gimbal flexures, such that the gimbal is capable of rotary oscillatory motion relative to the substrate about a Z axis that is orthogonal to the plane of the gimbal;

a generally planar plate gyro outer member located within, coplanar with, and flexibly coupled to the gimbal such that the gyro outer member is capable of oscillatory motion relative to the substrate about a drive axis that is in the plane of the gyro outer member and orthogonal to the input axis;

a generally planar plate gyro inner member located within, coplanar with, and flexibly coupled to the gyro outer member such that the gyro inner member is capable of rotary oscillatory motion relative to the gyro outer member about an output axis that is orthogonal to the plane of the gyro inner and outer members in response to input rotation rate, and such that the gyro inner member will oscillate with the gyro outer member relative to the substrate about the drive axis, as the gyro outer member is oscillated about the drive axis;

one or more gimbal drives for oscillating the gimbal about the Z axis at a gimbal oscillation frequency, and thereby also oscillating the gyro inner and outer members about the Z axis at the gimbal oscillation frequency;

one or more gyro outer member drives for directly oscillating the gyro outer member about the drive axis, and thereby also oscillating the gyro inner member about the drive axis; one or more gyro outer member motion sensors that sense motion of the gyro outer member relative to the substrate about the drive axis; and one or more gyro inner member motion sensors having an output signal, the gyro inner member motion sensors detecting oscillation of the gyro inner member relative to the gyro outer member about the output axis caused by rotation of the gyroscope about the gyro input axis;

(b) providing the gimbal drives with an oscillatory excitation signal that oscillates the gimbal at a frequency that is greater than the bias instability frequency;

(c) detecting the gyro inner member motion sensors output signal; and (d) demodulating the gyro inner member motion sensors output signal with the gimbal drive oscillatory excitation signal, phase referenced to the gyro input axis.

2. The method of claim 1 in which the gimbal oscillation is about a small angle.

3. A system that separates bias instability of a rotating MEMS gyroscope having an output signals from the gyroscope's output signal, in which the bias instability has a frequency, the system comprising:

(a) a bias-stabilized gyroscope that lies generally in a plane, for detecting rotation rate about a gyro input axis that lies in the plane, the gyroscope comprising:

a substrate defining a surface;

spaced bonding pads coupled to the substrate and projecting from the surface of the substrate;

a generally planar gimbal spaced from and essentially parallel to the surface of the substrate and flexibly coupled to the bonding pads by gimbal flexures, such that the gimbal is capable of rotary oscillatory motion relative to the substrate about a Z axis that is orthogonal to the plane of the gimbal;

a generally planar plate gyro outer member located within, coplanar with, and flexibly coupled to the gimbal such that the gyro outer member is capable of oscillatory motion relative to the substrate about a drive axis that is in the plane of the gyro outer member and orthogonal to the input axis;

a generally planar plate gyro inner member located within, coplanar with, and flexibly coupled to the gyro outer member such that the gyro inner member is capable of rotary oscillatory motion relative to the gyro outer member about an output axis that is orthogonal to the plane of the gyro inner and outer members in response to input rotation rate, and such that the gyro inner member will oscillate with the gyro outer member relative to the substrate about the drive axis, as the gyro outer member is oscillated about the drive axis;

one or more gimbal drives for oscillating the gimbal about the Z axis at a gimbal oscillation frequency, and thereby also oscillating the gyro inner and outer members about the Z axis at the gimbal oscillation frequency;

one or more gyro outer member drives for directly oscillating the gyro outer member about the drive axis, and thereby also oscillating the gyro inner member about the drive axis:

one or more gyro outer member motion sensors that sense motion of the gyro outer member relative to the substrate about the drive axis; and one or more gyro inner member motion sensors having an output signal, the gyro inner member motion sensors detecting oscillation of the gyro inner member relative to the gyro outer member about the output axis caused by rotation of the gyroscope about the gyro input axis;

(b) a device for providing the gimbal drives with an oscillatory excitation signal that oscillates the gimbal at a frequency that is greater than the bias instability frequency;

(c) electronics for detecting the gyro inner member motion sensors output signal; and (d) electronics for demodulating the gyro inner member motion sensors output signal with the gimbal drive oscillatory excitation signal, phase referenced to the gyro input axis.

4. The system of claim 3 in which the gimbal oscillation is about a small angle.

5. A bias-stabilized gyroscope that lies generally in a plane, for detecting rotation rate about a gyro input axis that lies in the plane, comprising:

a substrate defining a surface;

spaced bonding pads coupled to the substrate and projecting from the surface of the substrate;

a generally planar gimbal spaced from and essentially parallel to the surface of the substrate and flexibly coupled to the bonding pads by gimbal flexures, such that the gimbal is capable of rotary oscillatory motion relative to the substrate about a Z axis that is orthogonal to the plane of the gimbal;

a generally planar plate gyro outer member located within, coplanar with, and flexibly coupled to the gimbal such that the gyro outer member is capable of oscillatory motion relative to the substrate about a drive axis that is in the plane of the gyro outer member and orthogonal to the input axis;

a generally planar plate gyro inner member located within, coplanar with, and flexibly coupled to the gyro outer member such that the gyro inner member is capable of rotary oscillatory motion relative to the gyro outer member about an output axis that is orthogonal to the plane of the gyro inner and outer members in response to input rotation rate, and such that the gyro inner member will oscillate with the gyro outer member relative to the substrate about the drive axis, as the gyro outer member is oscillated about the drive axis;

one or more gimbal drives for oscillating the gimbal about the Z axis at a gimbal oscillation frequency, and thereby also oscillating the gyro inner and outer members about the Z axis at the gimbal oscillation frequency;

one or more gyro outer member drives for directly oscillating the gyro outer member about the drive axis, and thereby also oscillating the gyro inner member about the drive axis; one or more gyro outer member motion sensors that sense motion of the gyro outer member relative to the substrate about the drive axis; and one or more gyro inner member motion sensors that detect oscillation of the gyro inner member relative to the gyro outer member about the output axis caused by rotation of the gyroscope about the gyro input axis.

6. The bias-stabilized gyroscope of claim 5 in which the gyro outer member drives comprise capacitive drives.

7. The bias-stabilized gyroscope of claim 6 in which the gyro outer member drives and the gyro outer member motion sensors each comprise plates on the surface of the substrate, spaced from the gyro outer member, and in which the gyro outer member drive and gyro outer member motion sensor plates are electrically isolated from one another.

8. The bias-stabilized gyroscope of claim 7 in which at least the surface of the substrate on which the drive and sensor plates are located is electrically insulating.

9. The bias-stabilized gyroscope of claim 8 in which at least the surface of the substrate on which the drive and sensor plates are located is Pyrex glass.

10. The bias-stabilized gyroscope of claim 5 in which there is at least one gyro outer member drive on each side of the drive axis.

11. The bias-stabilized gyroscope of claim 5 in which the gyro inner member motion sensors comprise capacitive sensors.

12. The bias-stabilized gyroscope of claim 11 in which the one or more gyro inner member motion sensors comprise a rotary comb sensor comprising sets of mating combs defined by one or more stators coupled to the substrate and one or more rotors coupled to the gyro inner member.

13. The bias-stabilized gyroscope of claim 12 in which the rotary comb sensor comprises four stator sectors coupled to the substrate that are symmetrically, radially arranged around the output axis and electrically isolated from one another, and a single radial rotor.

14. The bias-stabilized gyroscope of claim 13 comprising two pairs of diametrically opposed rotary comb sensor sectors that generate output signals, in which the output signals from the diametrically opposed sectors are added, and the summed output signals from the pairs are differenced, to increase the signal strength and reduce common-mode noise.

15. The bias-stabilized gyroscope of claim 5 further comprising a controller, responsive to the gyro outer member motion sensors, for maintaining the oscillation amplitude of the gyro outer member constant.

16. The bias-stabilized gyroscope of claim 5 in which the gyro inner member natural frequency for oscillation about the output axis is close to but offset from the gyro outer member plus gyro inner member natural frequency for oscillation about the drive axis.

17. The bias-stabilized gyroscope of claim 5 in which the gyro inner member is flexibly coupled to the gyro outer member by a plurality of gyro inner member flexures.

18. The bias-stabilized gyroscope of claim 17 in which the gyro inner member defines a circular perimeter, and the gyro inner member flexures are spaced evenly about the gyro inner member perimeter.

19. The bias-stabilized gyroscope of claim 18 in which the gyro inner member flexures each comprise two bending "U"flexures.

20. The bias-stabilized gyroscope of claim 19 in which the gyro inner member flexures each further comprise a stress relief feature comprising a bend in the flexure.

21. The bias-stabilized gyroscope of claim 17 in which the gyro inner member is coupled to the gyro outer member by flexures that are radial relative to the output axis.

22. The bias-stabilized gyroscope of claim 5 in which the gyro inner member and the gyro outer member are each generally annular, and are concentric.

23. The bias-stabilized gyroscope of claim 5 in which the gyro inner member natural frequency for oscillation about the output axis is the same as the gyro outer member plus gyro inner member natural frequency for oscillation about the drive axis.

24. The bias-stabilized gyroscope of claim 5 further comprising a controller, responsive to the gyro outer member motion sensors, for controlling the gyro outer member drives such that the gyro outer member plus gyro inner member oscillate together about the drive axis at resonance.

25. The bias-stabilized gyroscope of claim 5 in which the gyro outer member is flexibly coupled to the gimbal by a pair of colinear torsional flexures that each comprise a stress relief feature.

26. The bias-stabilized gyroscope of claim 5 in which the gyro outer member and the gyro inner member are each symmetric about the drive axis and the output axis.

27. The bias-stabilized gyroscope of claim 5 in which at least the gimbal, the gyro outer member, the gyro inner member and the bonding pads are made from a silicon monolith.

28. The bias-stabilized gyroscope of claim 27 in which at least the gimbal, the gyro outer member, the gyro inner member and the bonding pads are made by a dissolved wafer process.

29. The bias-stabilized gyroscope of claim 5 in which at least the gyro outer member and the gyro inner member are maintained at a common electrical potential.

30. The bias-stabilized gyroscope of claim 29 in which the common electrical potential is ground.

31. The bias-stabilized gyroscope of claim 5 further comprising one or more gyro inner member motion sensors that sense motion of the gyro inner member about the drive axis.

32. The bias-stabilized gyroscope of claim 5 in which the gyro inner member oscillation frequency about the output axis caused by rotation of the gyroscope about the gyro input axis is the same as the gyro outer member drive frequency.

33. The bias-stabilized gyroscope of claim 5 in which the gimbal defines a circular perimeter, and the gimbal flexures are spaced evenly about the gimbal perimeter.

34. The bias-stabilized gyroscope of claim 33 in which the gimbal flexures each comprise two bending "U", flexures.

35. The bias-stabilized gyroscope of claim 34 in which the gimbal flexures each further comprise a stress relief feature.

36. The bias-stabilized gyroscope of claim 5 in which the gyro inner member, the gyro outer member and the gimbal are each generally annular, and are concentric.

37. The bias-stabilized gyroscope of claim 5 in which the gyro inner member, the gyro outer member and the gimbal are each symmetric about both the drive axis and the output axis.

38. The bias-stabilized gyroscope of claim 5 further comprising one or more gimbal oscillation sensors for determining the angular amplitude of the gimbal oscillation about the Z axis.

39. The bias-stabilized gyroscope of claim 38 in which the gimbal drives and gimbal oscillation sensors each comprise a portion of a rotary comb capacitive device comprising sets of mating combs defined by one or more stators coupled to the substrate and one or more rotors coupled to the gimbal.

40. The bias-stabilized gyroscope of claim 39 in which the rotary comb capacitive device comprises four stator sectors that are symmetrically, radially arranged around the Z axis, and a single radial rotor, and two stator sectors are used to drive the gimbal, and the other two are used to sense gimbal motion about the Z axis.

41. The bias-stabilized gyroscope of claim 5 in which the gimbal oscillation about the Z axis is at a repeated angle amplitude.

42. The bias-stabilized gyroscope of claim 5 in which the gyroscope exhibits long-term drift, 1/f bias instability and white noise, and the gimbal oscillation frequency is in the white noise spectrum.

43. The bias-stabilized gyroscope of claim 5 in which the gimbal drives are provided with an oscillatory excitation signal, and the gyro inner member motion sensors have an output signal that is modulated by the gimbal oscillation, and the modulated signal is demodulated with the gimbal drive oscillatory excitation signal, phase referenced to the gyro input axis, to obtain a dc value that is proportional to the rotation rate of the gyroscope about the gyro input axis.

44. The bias-stabilized gyroscope of claim 43 in which the gimbal drives oscillate the gimbal about the Z axis while the gyroscope is rotating about the gyro input axis, to bias stabilize the gyroscope during gyroscope operation.

45. The bias-stabilized gyroscope of claim 44 in which the bias stabilization decreases gyroscope instability.

46. The bias-stabilized gyroscope of claim 45 in which the instability that is decreased comprises 1/f bias instability.

* * * * *

UNITED STATES PATENT AND TRADEMARK OFFICE
CERTIFICATE OF CORRECTION

PATENT NO. : 7,549,334 B2
APPLICATION NO. : 11/739499
DATED : June 23, 2009
INVENTOR(S) : Donato Cardarelli Page 1 of 1

It is certified that error appears in the above-identified patent and that said Letters Patent is hereby corrected as shown below:

Column 20, line 57, that portion of the line reading "having an output signals from" should be changed to --having an output signal from--

Signed and Sealed this

Twenty-fifth Day of August, 2009

David J. Kappos
*Director of the United States Patent and Trademark Office*